US008316096B2

(12) United States Patent
Svendsen et al.

(10) Patent No.: US 8,316,096 B2
(45) Date of Patent: *Nov. 20, 2012

(54) FACEMAIL

(75) Inventors: Hugh Svendsen, Chapel Hill, NC (US);
Scott Curtis, Durham, NC (US)

(73) Assignee: Kota Enterprises, LLC, Wilmington, DE (US)

( * ) Notice: Subject to any disclaimer, the term of this patent is extended or adjusted under 35 U.S.C. 154(b) by 232 days.

This patent is subject to a terminal disclaimer.

(21) Appl. No.: 12/913,082

(22) Filed: Oct. 27, 2010

(65) Prior Publication Data

US 2012/0072996 A1    Mar. 22, 2012

Related U.S. Application Data

(63) Continuation-in-part of application No. 12/111,456, filed on Apr. 29, 2008.

(51) Int. Cl.
*G06F 15/16* (2006.01)
*G06K 9/00* (2006.01)
(52) U.S. Cl. ......... 709/206; 709/203; 382/118; 382/181
(58) Field of Classification Search .................. 709/203, 709/206; 382/118, 181
See application file for complete search history.

(56) References Cited

U.S. PATENT DOCUMENTS

| | | | | |
|---|---|---|---|---|
| 6,038,333 | A * | 3/2000 | Wang | 382/118 |
| 7,188,139 | B1 | 3/2007 | Ayatsuka et al. | |
| 7,203,759 | B1 | 4/2007 | Ostermann et al. | |
| 2002/0115445 | A1 | 8/2002 | Myllymaki | |
| 2002/0183112 | A1 | 12/2002 | Emmerson et al. | |
| 2003/0143079 | A1 | 7/2003 | Kawarada et al. | |
| 2004/0235460 | A1 | 11/2004 | Engstrom et al. | |
| 2004/0243671 | A9 | 12/2004 | Needham et al. | |
| 2005/0054352 | A1 | 3/2005 | Karaizman | |
| 2005/0191963 | A1 | 9/2005 | Hymes | |
| 2005/0280502 | A1 * | 12/2005 | Bell | 340/5.83 |
| 2006/0074750 | A1 | 4/2006 | Clark et al. | |
| 2006/0167944 | A1 | 7/2006 | Baker | |
| 2006/0224680 | A1 | 10/2006 | Terayoko | |
| 2006/0251338 | A1 | 11/2006 | Gokturk et al. | |
| 2006/0256959 | A1 * | 11/2006 | Hymes | 379/433.04 |
| 2007/0031800 | A1 | 2/2007 | Solomon | |

(Continued)

OTHER PUBLICATIONS

Wing W. Y. Ng, Tian-Ming Zheng et al. "Social Relationship Discovery and Face annotation in personal photo Collection", IEEE, ISBN: 978-1-4577-0308-9/11, pp. 631-637.*

(Continued)

*Primary Examiner* — Joseph Avellino
*Assistant Examiner* — Aftab Nasir Khan
(74) *Attorney, Agent, or Firm* — Withrow & Terranova, PLLC

(57) ABSTRACT

Systems and methods are disclosed for generating, sending, and delivering a message addressed using an image of an intended message recipient of the message. In one embodiment, a central server receives a message including an image of an intended message recipient from a first user device of a first user. The central server then identifies a second user as the intended message recipient based on the image of the intended message recipient. Then, before delivering the message, the central server obtains an image of a user at a second user device associated with the second user and sends the image to the first user device where the image is presented to the first user. Upon receiving authentication from the first user device that the user at the second user device is the intended message recipient, the central server delivers the message to the second user device of the second user.

17 Claims, 20 Drawing Sheets

U.S. PATENT DOCUMENTS

| | | |
|---|---|---|
| 2008/0032277 A1 | 2/2008 | Maggio et al. |
| 2008/0086534 A1 | 4/2008 | Bardak et al. |
| 2008/0133716 A1 | 6/2008 | Rao et al. |
| 2008/0140650 A1 | 6/2008 | Stackpole |
| 2008/0162649 A1 | 7/2008 | Lee et al. |
| 2008/0201442 A1 | 8/2008 | Ostermann et al. |
| 2008/0263040 A1 | 10/2008 | Talreja |
| 2008/0307040 A1 | 12/2008 | So |
| 2009/0063995 A1 | 3/2009 | Baron et al. |
| 2009/0143079 A1 | 6/2009 | Klassen et al. |
| 2009/0170532 A1 | 7/2009 | Lee et al. |
| 2009/0175499 A1 | 7/2009 | Rosenblatt |
| 2009/0175509 A1* | 7/2009 | Gonion et al. ............... 382/118 |
| 2009/0271212 A1 | 10/2009 | Savjani et al. |
| 2009/0271484 A1 | 10/2009 | Svendsen et al. |
| 2009/0287763 A1 | 11/2009 | Svendsen et al. |
| 2010/0150410 A1 | 6/2010 | Shah et al. |
| 2010/0172550 A1 | 7/2010 | Gilley et al. |
| 2011/0317872 A1* | 12/2011 | Free ............................. 382/103 |

OTHER PUBLICATIONS

Kashmir Hill, "Welcome to the Not-So Private Parts where technology & privacy collide—Google Patents a celebrity facial recognition database" Forbes, May 19, 2011.*

Eric Liberman and Robert C. Miller, FACEMAIL: Showing Faces of Recipients to Prevent Misdirected Email, MIT COmputer Science and Artificial Intelligence Lab, Cambrige, Copy Rights by SOUPS Jul. 18-20, 2007, Pittsburg, PA.*

Lieberman et al., "Facemail: Showing Faces of Recipients to Prevent Misdirected Email," Symposium on Usable Privacy and Security (SOUPS) 2007, Jul. 18-20, 2007, 10 pages.

* cited by examiner

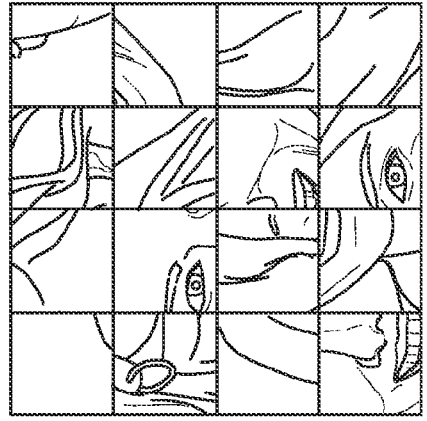
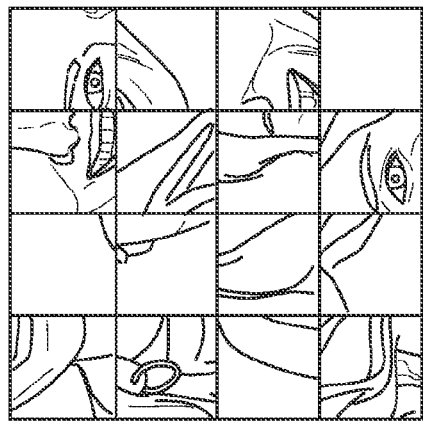
FIG. 9A
FIG. 9B

BLUR

GLASS

CARTOON

TWIRL

CRYSTALLIZE

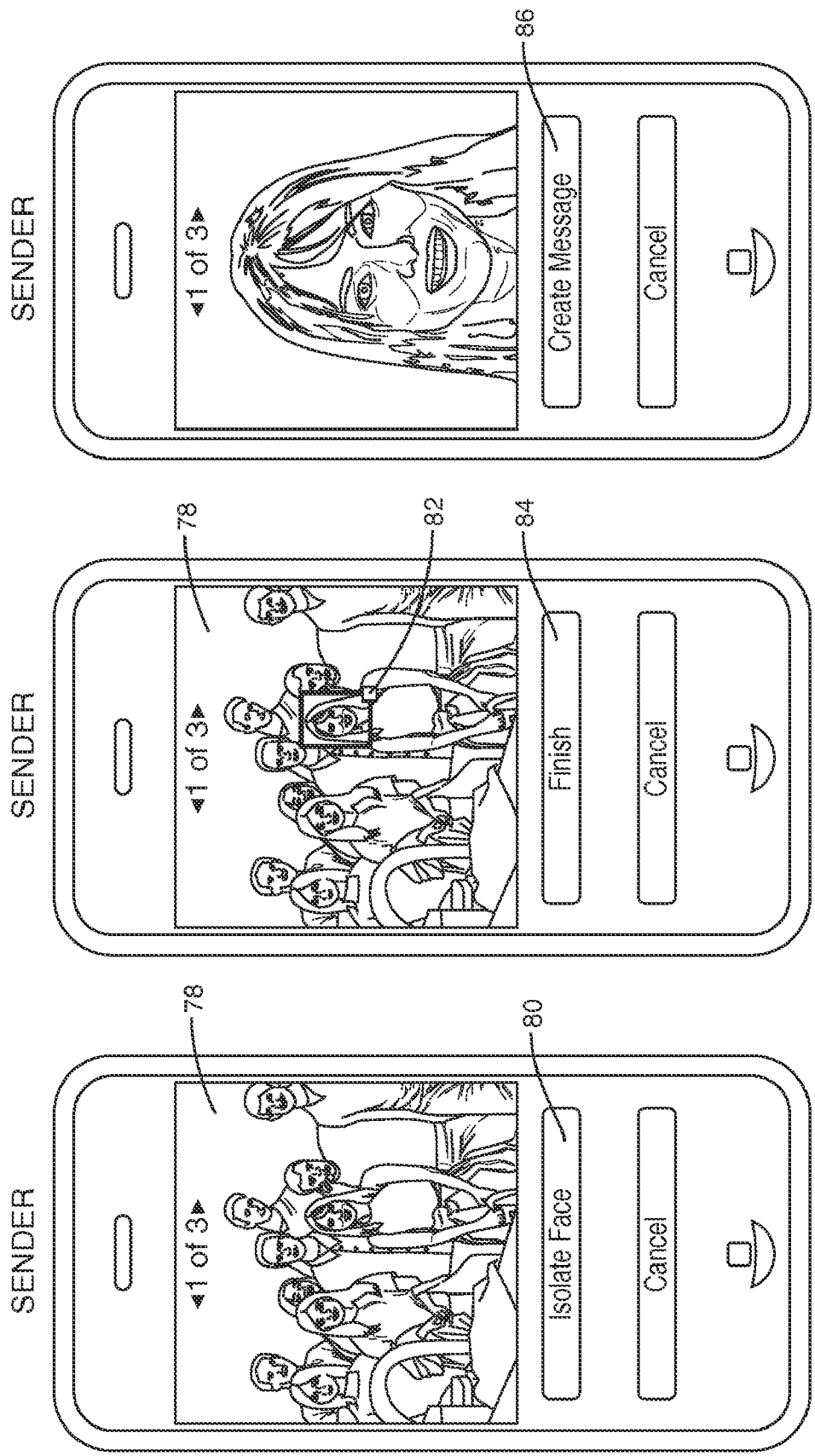

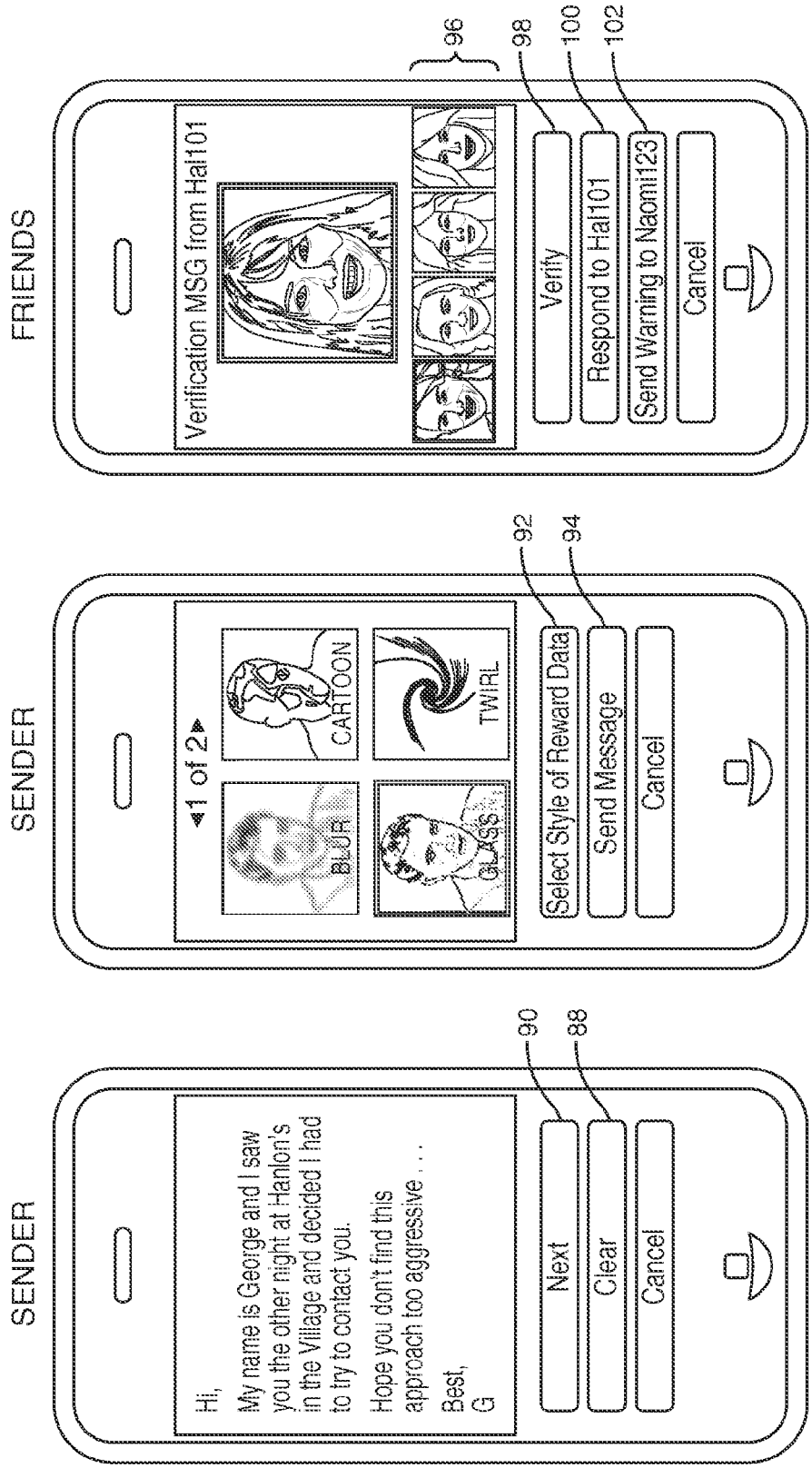

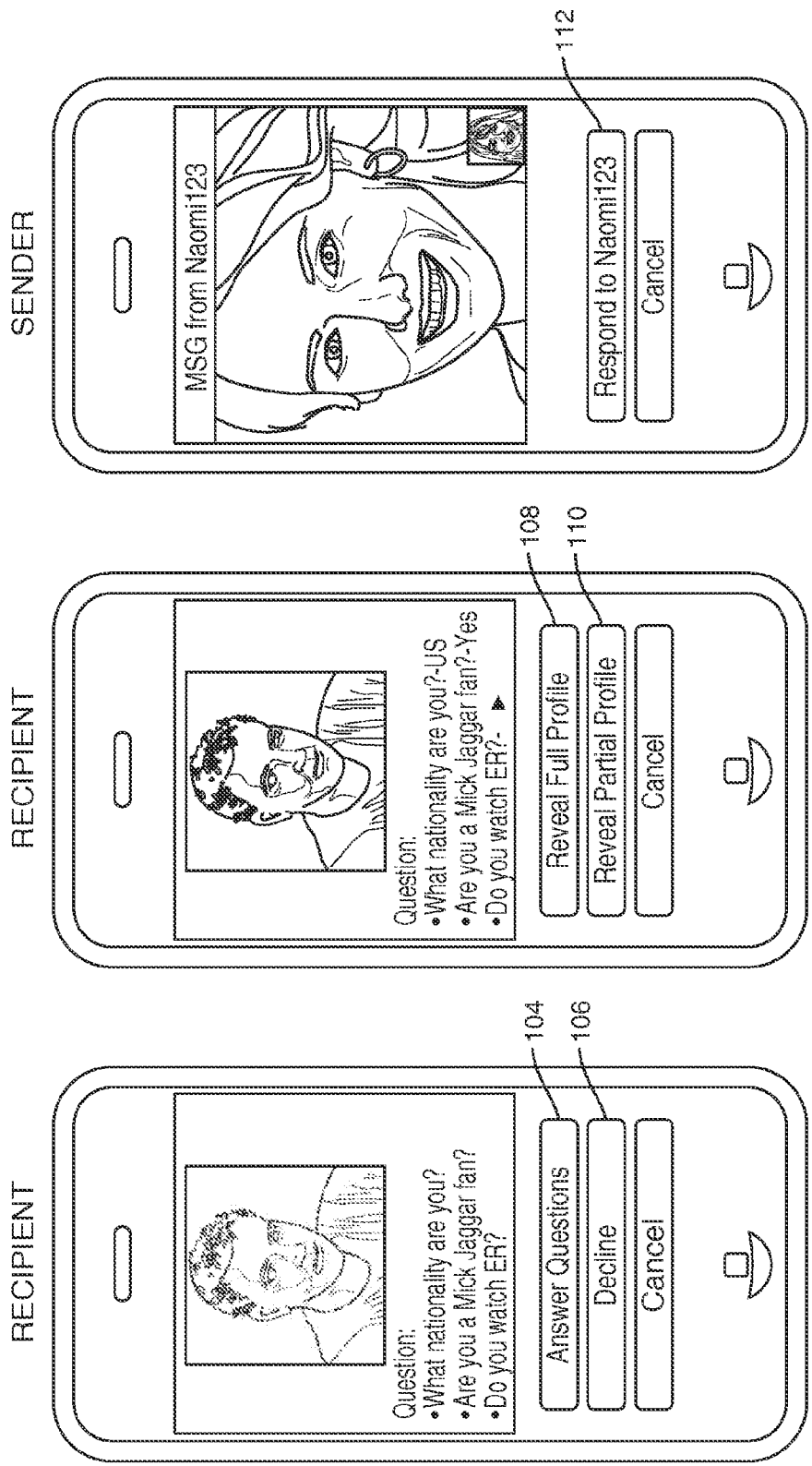

| Question Body | Answer Suggestion Scheme | Point Value | Keywords |
|---|---|---|---|
| What is your Favorite Band? | Calculated at Server | 5 | MEDIA |
| What is the last song you bought? | Calculated at Server | 5 | MEDIA |
| What is the last album you bought? | Calculated at Server | 5 | MEDIA |
| What was the last concert you attended? | Calculated at Server | 5 | MEDIA |
| What was the first concert you attended? | Calculated at Server | 5 | MEDIA |
| What is the last book you read? | Recipient Types In first time - then pulled from server | 10 | MEDIA |
| What is your favorite Movie? | Calculated at Server | 5 | MEDIA |
| Who is your favorite Actor? | Calculated at Server | 5 | MEDIA |
| What School Do you attend? | Pulled From Profile | 5 | SCHOOL, SPORTS |
| What is your favorite Sport? | Recipient Types In first time - then pulled from server | 5 | SPORTS |
| Who is going to win the next Super Bowl? | Multiple Choice | 5 | SPORTS |
| What is your Major? | Recipient Types In first time - then pulled from server | 10 | SCHOOL |
| What is your political affiliation? | Recipient Types In first time - then pulled from server | 10 | POLITICS |
| Who did you vote for in last presidential election? | Multiple Choice | 10 | POLITICS |
| Do you come here often? | Calculated at Server | 10 | DATING |
| How old are you? | Pulled From Profile | 20 | DATING |
| What is your telephone number? | Pulled From Profile | 20 | DATING |
| Do you live near here? | Calculated at Server | 30 | DATING |
| Married / Single? | Pulled From Profile | 30 | DATING |

*FIG. 22*

FACEMAIL

RELATED APPLICATIONS

This application is a Continuation-in-Part (CIP) of U.S. Patent Application Publication No. 2009/0271484, which was filed on Apr. 29, 2008 and is hereby incorporated herein by reference in its entirety.

FIELD OF THE DISCLOSURE

The present disclosure relates to generation and delivery of a message addressed using an image of the intended message recipient.

BACKGROUND

Oftentimes a person finds himself in a situation where he would like to communicate with someone that he has encountered but he does not have access to the necessary contact information for that person. As such, there is a need for a system and method of enabling a first person to contact a second person for whom the first person does not have contact information.

SUMMARY

Systems and methods are disclosed for generating, sending, and delivering a message addressed using an image of an intended message recipient of the message. In one embodiment, a sending user at a first user device obtains an image of an intended message recipient. A message to the intended message recipient is then generated, addressed using the image of the intended message recipient, and sent from the first user device of the sending user to a central server. The central server identifies a second user as the intended message recipient based on the image of the intended message recipient. The central server then sends an authentication request to a second user device of the second user in order to authenticate that a user at the second user device is in fact the intended message recipient. In response, the second user device obtains an image of the user at the second user device and returns the image of the user at the second user device to the central server. The central server then authenticates that the user at the second user device is in fact the intended message recipient based on the image of the user at the second user device. Once authentication is complete, the central server sends the message to the intended message recipient at the second user device. Upon receipt of the message, the second user device presents the message to the intended message recipient.

In one embodiment, the central server authenticates that the user at the second user device is in fact the intended message recipient by first returning the image of the user at the second user device to the first user device of the sending user where the image of the user at the second user device is presented to the sending user. The first user device then receives user input from the sending user authenticating that the user at the second user device is in fact the intended message recipient. In response, the first user device sends an authentication message to the central server that indicates that the user at the second user device is in fact the intended message recipient. Upon receiving the authentication message from the first user device, the central server sends the message to the intended message recipient at the second user device.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 9A and 9B illustrate exemplary reward states for a reward revealed to an intended message recipient in response to the intended message recipient answering questions according to one embodiment of the present disclosure;

Figure 1:
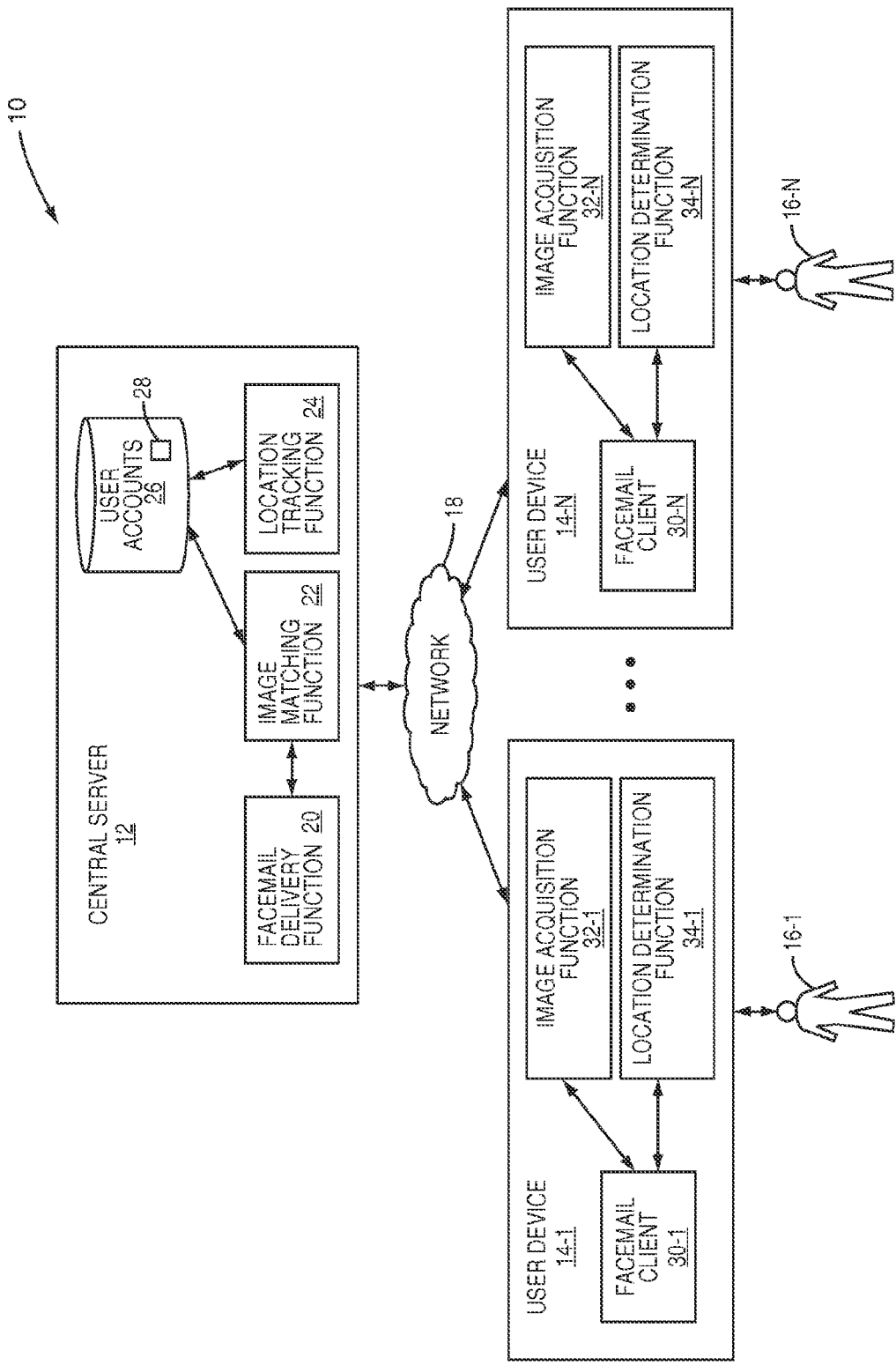
FIG. 1 illustrates a system for delivering a message based on an image of an intended message recipient according to one embodiment of the present disclosure.
Figure 5:
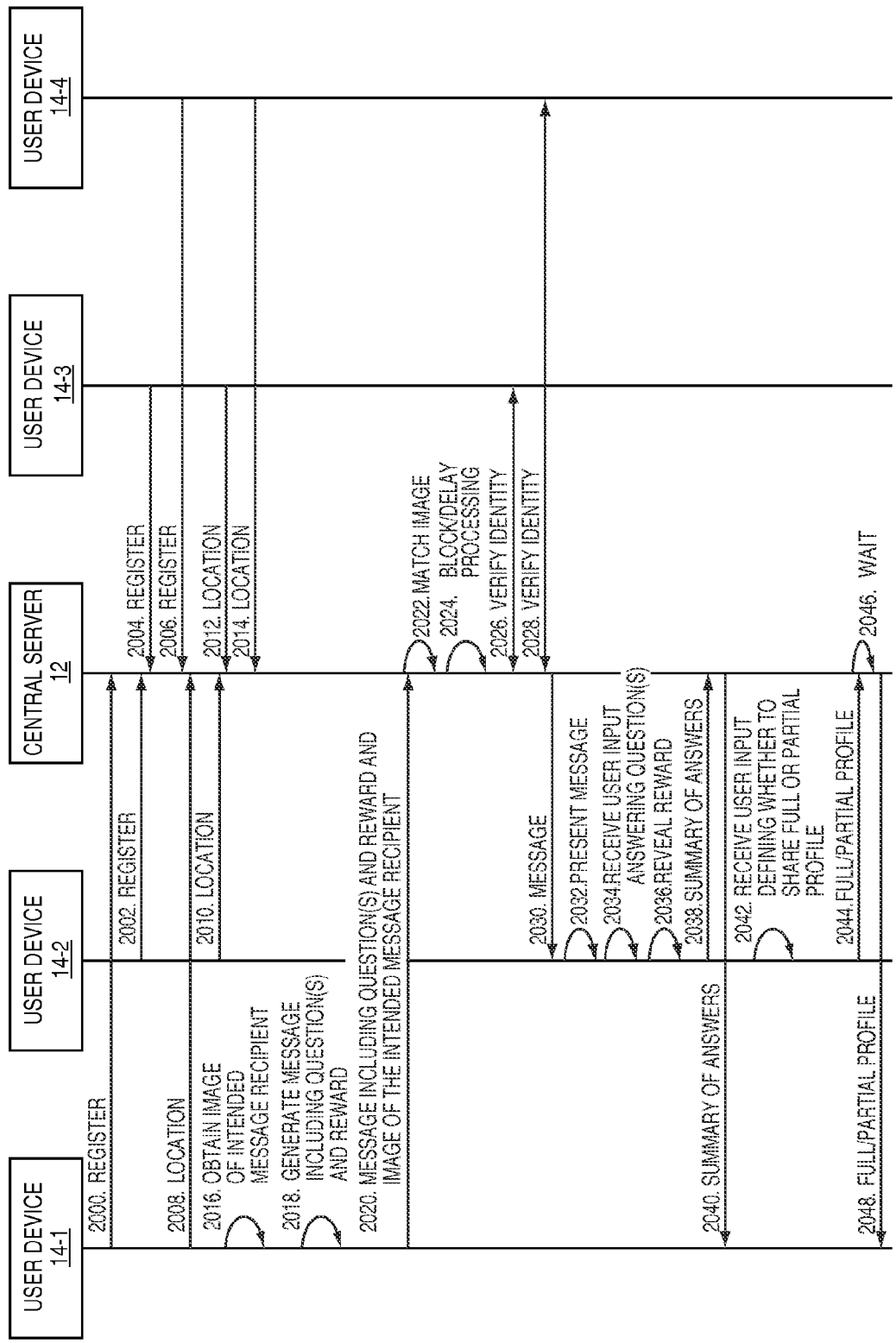
FIG. 5 illustrates the operation of the system of FIG. 1 according to another embodiment of the present disclosure.
Figure 16:
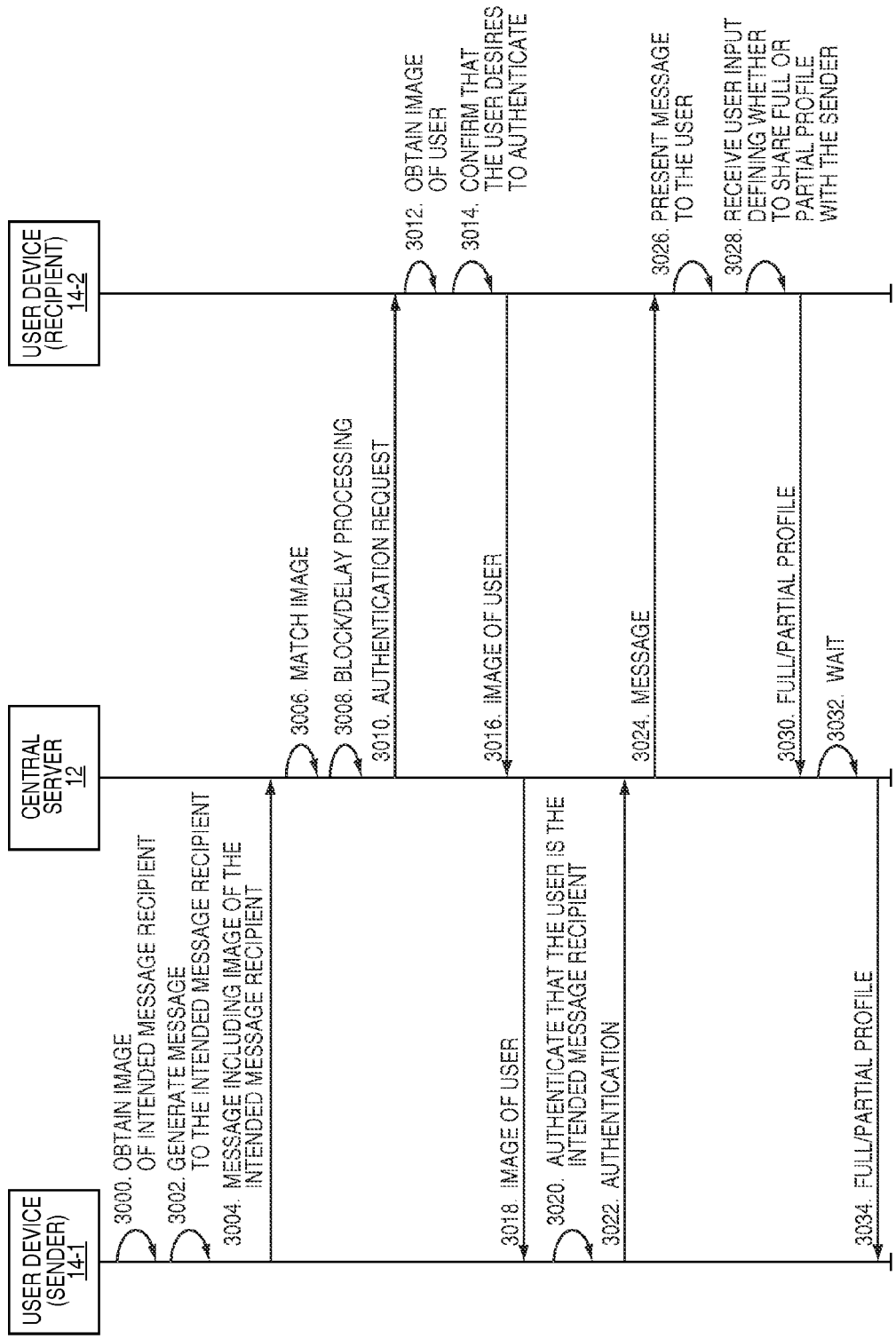
Figure 17:
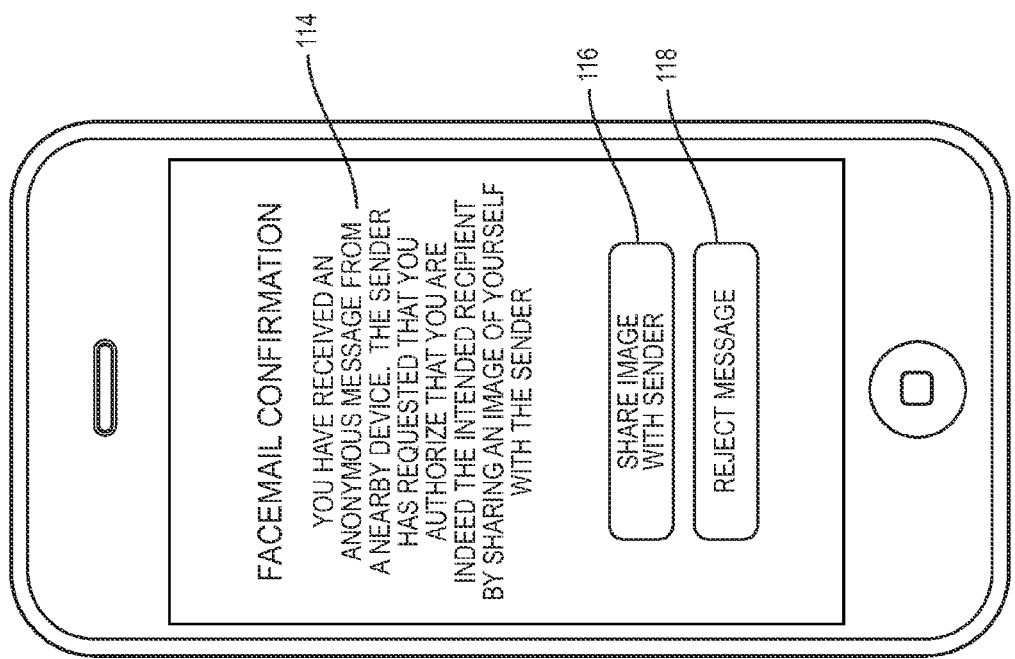
Figure 18:
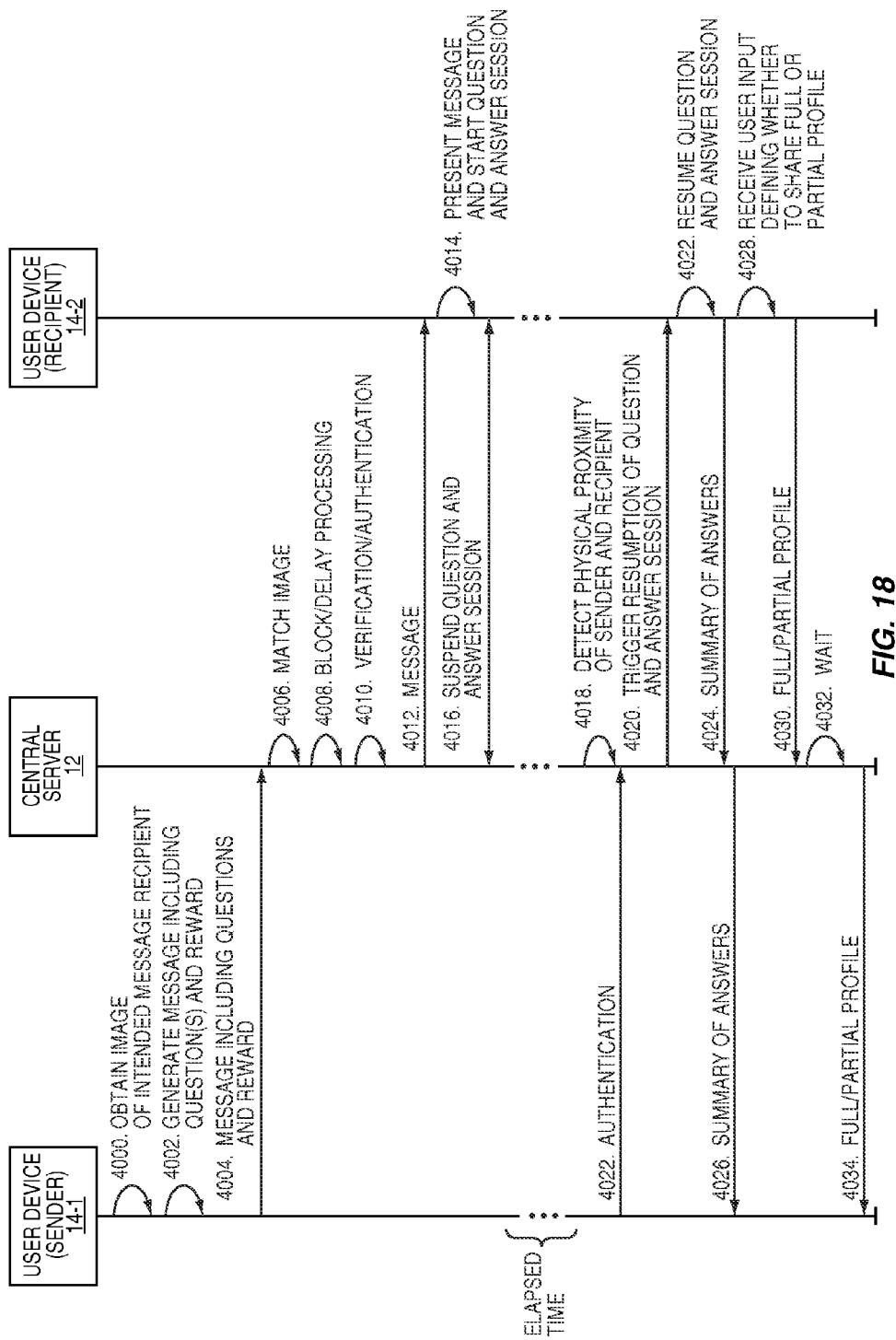
Figure 19:
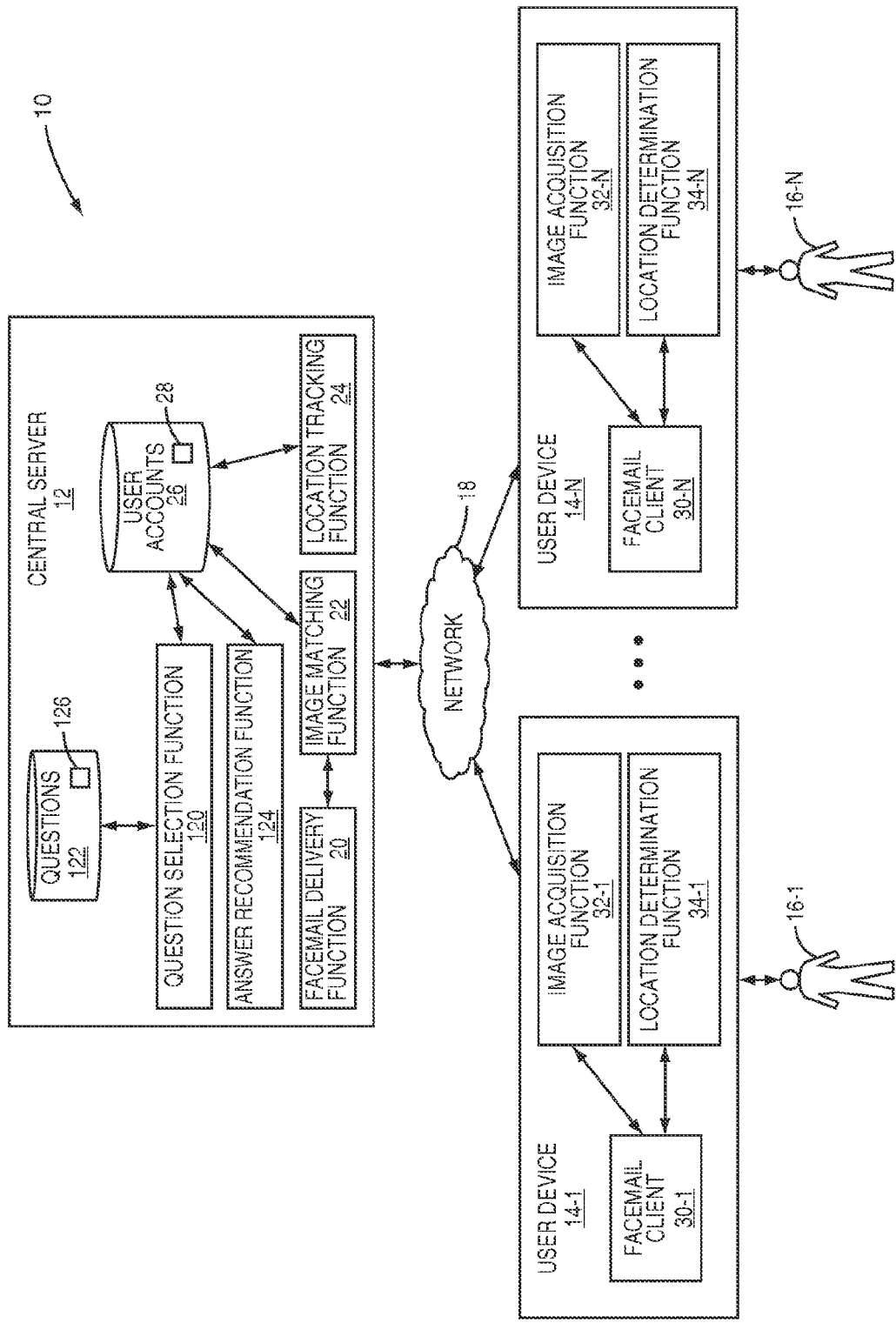
Figure 20:
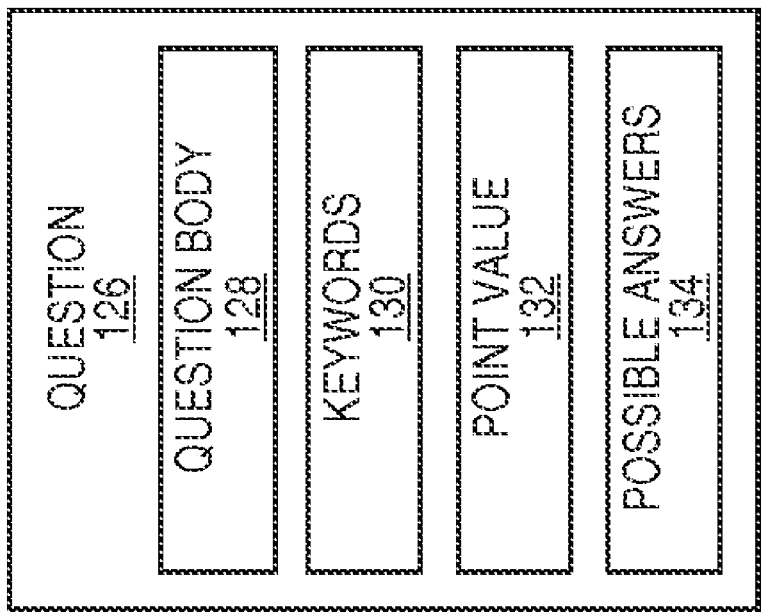
Figure 21A:
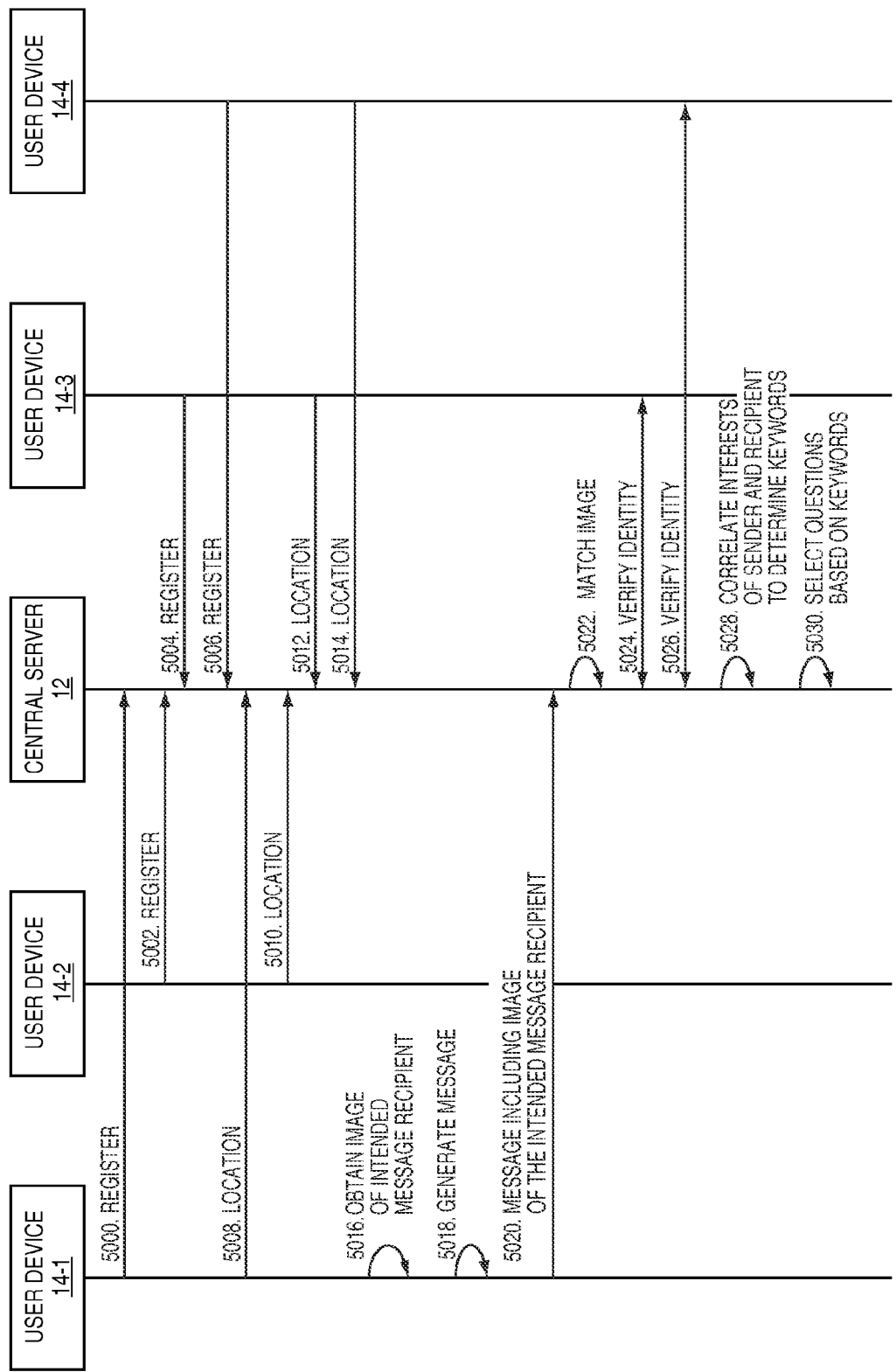
Figure 21B:
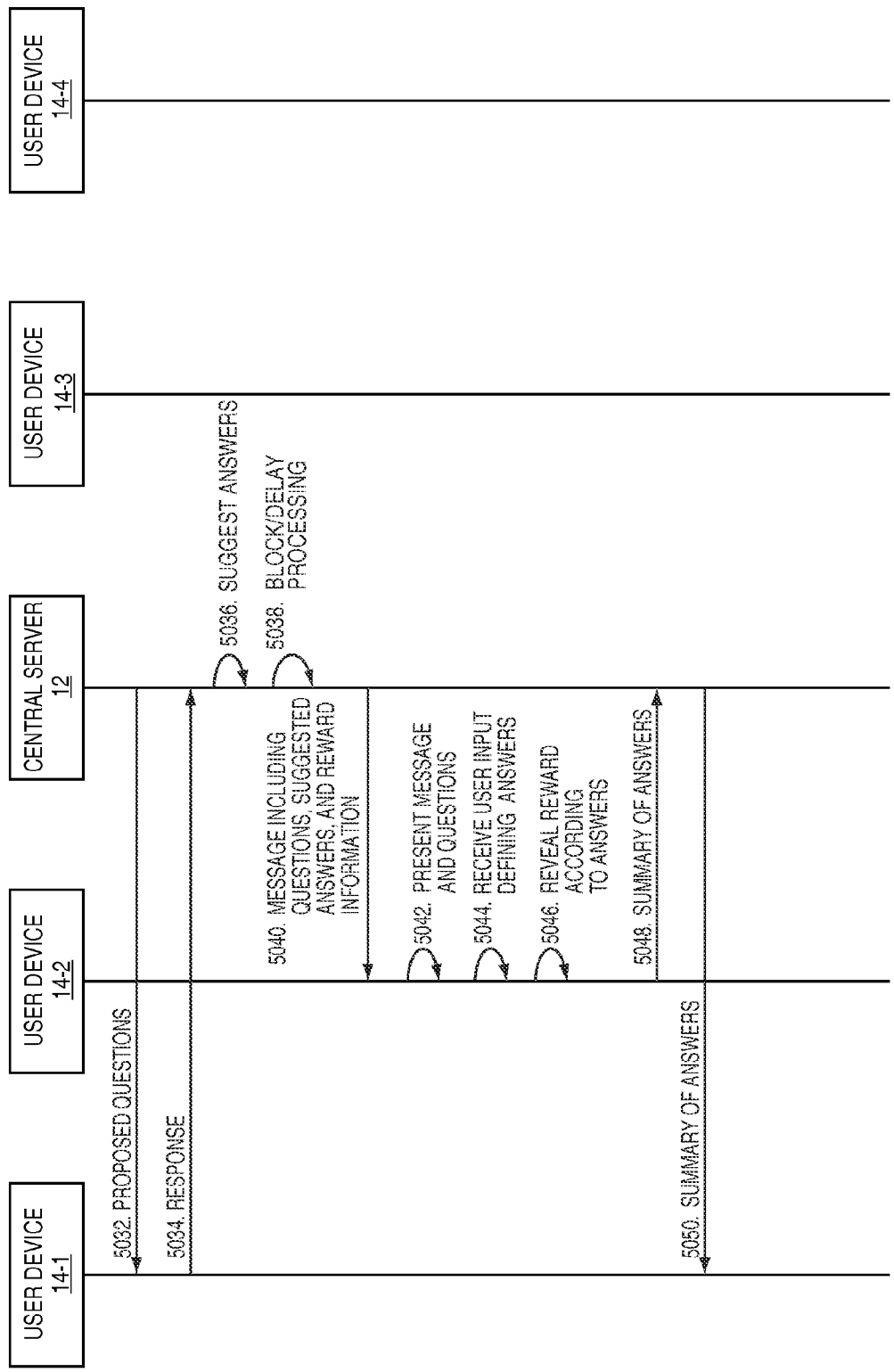
Figure 24:
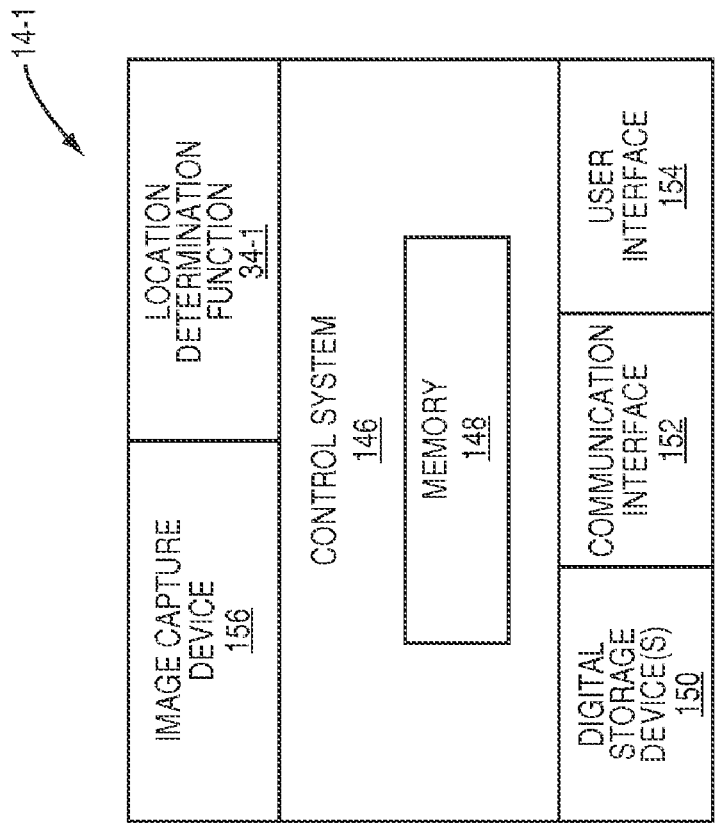
Figure 23:
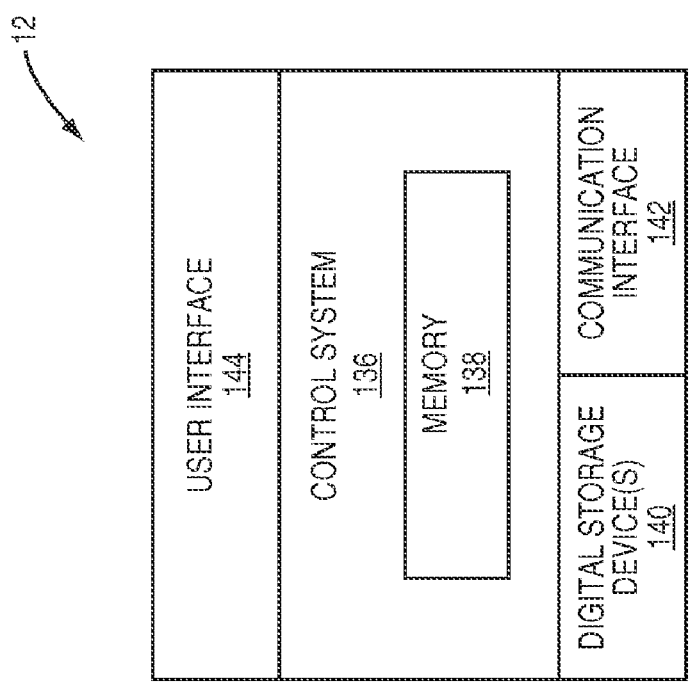

FIGS. 15A through 15I graphically illustrate the process of FIG. 5 according to an exemplary embodiment of the present disclosure;

FIG. 16 illustrates the operation of the system of FIG. 1 according to another embodiment of the present disclosure;

FIG. 17 illustrates an exemplary graphical user interface for obtaining approval from a user to use the user's image for authentication during the process of FIG. 16 according to one embodiment of the present disclosure;

FIG. 18 illustrates the operation of the system of FIG. 1 according to another embodiment of the present disclosure;

FIG. 19 illustrates a system for delivering a message based on an image of an intended message recipient according to another embodiment of the present disclosure;

FIG. 20 illustrates an exemplary question according to the embodiment of the system illustrated in FIG. 19;

FIGS. 21A and 21B illustrate the operation of the system of FIG. 19 according to one embodiment of the present disclosure;

FIG. 22 provides a list of exemplary questions and corresponding schemes for suggesting answers to the questions according to one embodiment of the present disclosure;

FIG. 23 is a block diagram of the central server of FIGS. 1 and 19 according to one embodiment of the present disclosure; and FIG. 24 is a block diagram of one of the user devices of FIGS. 1 and 19 according to one embodiment of the present disclosure.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 illustrates an exemplary system 10 for generating messages, addressing the messages using images of intended message recipients of the messages, and delivering the messages to the intended message recipients based on the image according to one embodiment of the present disclosure. In general, the system 10 includes a central server 12 and a number of user devices 14-1 through 14-N having associated users 16-1 through 16-N. The central server 12 and the user devices 14-1 through 14-N are connected via a network 18. The network 18 may be any type of Wide Area Network (WAN), Local Area Network (LAN), or the like, or any combination thereof, and may include wired components, wireless components, or both wired and wireless components. Note that while the central server 12 is illustrated as a single server, the central server 12 may alternatively be implemented as multiple servers having the functionality of the central server 12 distributed thereon. As another alternative, all or a portion of the functionality of the central server 12 may be distributed among the user devices 14-1 through 14-N.

The central server 12 includes a facemail delivery function 20, an image matching function 22, a location tracking function 24, and a user accounts database 26. The facemail delivery function 20 may be implemented in software, hardware, or a combination thereof. In general, the facemail delivery function 20 operates to receive messages addressed with images of intended message recipients, provide the images of the intended message recipients to the image matching function 22 for identification of the intended message recipients, and deliver the messages to the intended message recipients.

The image matching function 22 may be implemented in software, hardware, or a combination thereof. In general, images of the users 16-1 through 16-N are stored in user accounts 28 of the users 16-1 through 16-N in the user accounts database 26, as discussed below. The image matching function 22 operates to match images of intended message recipients of messages received by the facemail delivery function 20 to the images of the users 16-1 through 16-N stored in the user accounts 28 to identify the intended message recipients of the messages. After identifying the intended message recipients, the contact information for the intended message recipients is provided to or otherwise obtained by the facemail delivery function 20 in order to deliver the messages to the intended message recipients. The contact information is generally any type of information enabling the facemail delivery function 20 to deliver the messages to the intended message recipients. For example, the contact information may be email addresses of the intended messages recipients, usernames of the intended message recipients such as those used by instant messaging applications, usernames or other identifiers of the intended message recipients used by the facemail service (i.e., facemail IDs), or the like.

The location tracking function 24 may be implemented in software, hardware, or a combination thereof. In general, the location tracking function 24 operates to obtain the locations of the users 16-1 through 16-N from the user devices 14-1 through 14-N. In one embodiment, the location tracking function 24 polls the user devices 14-1 through 14-N for their locations periodically or as otherwise desired. In another embodiment, the user devices 14-1 through 14-N periodically provide their locations to the location tracking function 24, provide their initial locations to the location tracking function 24 and thereafter send updates as their locations change, or the like. The locations of the users 16-1 through 16-N are stored in the user accounts 28 of the users 16-1 through 16-N in the user accounts database 26. In addition, as discussed below, the user accounts 28 of the users 16-1 through 16-N may include historical records of the locations of the users 16-1 through 16-N for at least a predetermined amount of time such as, for example, the last day, the last week, the last month, or the like.

The user accounts database 26 generally operates to store a user account 28 for each of the users 16-1 through 16-N registered with the system 10. Using the user 16-1 as an example, the user account 28 of the user 16-1 generally includes a user profile of the user 16-1 and an image, or picture, of the user 16-1. The user profile may include, for example, contact information for the user 16-1 such as an email address, instant messaging username, telephone number, facemail ID, or the like. In addition, the user profile may include demographic information such as sex, age, height, weight, or the like. In addition to the user profile and the image of the user 16-1, the user account 28 of the user 16-1 may include a current location of the user 16-1 and a historical record of the location of the user 16-1. Still further, for certain embodiments of the present disclosure, the user account 28 of the user 16-1 may include a friends list of the user 16-1, preferences of the user 16-1, and/or answers provided to previous questions asked of the user 16-1. The preferences may include an indication as to whether the user 16-1 desires to receive messages sent by users identifying the user 16-1 as the intended message recipient using an image of the user 16-1 or the like. The preferences may also include preferences regarding blocking or delaying delivery of messages to the user 16-1 and/or preferences regarding whether to delay when the full or partial profile of the user 16-1 is to be revealed to a sending user that sent a message to the user 16-1, as discussed below in detail. As discussed below, in one embodiment, the answers provided to previous questions may be used to suggest answers to the same or similar questions received by the user 16-1 in the future.

The user devices 14-1 through 14-N are preferably mobile devices having networking capabilities. For example, the user devices 14-1 through 14-N may each be a mobile telephone such as an Apple® iPhone. However, the present disclosure is not limited to mobile devices. The user devices 14-1 through 14-N may also be, for example, personal computers or the like. The user device 14-1 includes a facemail client 30-1, an image acquisition function 32-1, and a location determination function 34-1. Likewise, the user devices 14-2 through 14-N include facemail clients 30-2 through 30-N, image acquisition functions 32-2 through 32-N, and location determination functions 34-2 through 34-N, respectively.

The facemail client 30-1 may be implemented in software, hardware, or a combination thereof. In general, the facemail client 30-1 operates under the control of the user 16-1 to generate a message, address the message using an image of an intended message recipient, and send the message including the image of the intended message recipient to the facemail delivery function 20. In addition, the facemail client 30-1 may enable the user 16-1 to crop an image to select an intended message recipient within an initial image such as an image of a group of persons. Still further, in some embodiments, the facemail client 30-1 may enable the user 16-1 to define questions to ask an intended message recipient and a reward to be revealed to the intended message recipient as the questions are answered by the intended message recipient.

The image acquisition function 32-1 generally enables the user 16-1 of the user device 14-1 to obtain an image of an intended message recipient. In one embodiment, the image acquisition function 32-1 is an image capture device. Preferably, the image acquisition device is or includes an image capture device (e.g., a digital camera) capable of capturing digital images. In another embodiment, the image acquisition function 32-1 is a software component that enables the user 16-1 to obtain an image of the desired message recipient from an existing collection of digital images. The existing collection of digital images may be stored locally by the user device 14-1 or stored at a remote source such as, for example, a photo sharing service (e.g., Flickr), a social networking website (e.g., Facebook), or the like. In yet another embodiment, the image acquisition function 32-1 is implemented in hardware and/or software and operates to obtain images of users of nearby user devices via local wireless communication (e.g., IEEE 802.11x connection, Bluetooth connection, near-field communication, or the like). For example, the image acquisition function 32-1 may periodically broadcast a request for images of nearby user devices via local wireless communication. In response, any of the user devices 14-2 through 14-N that are within the local wireless communication range of the user device 14-1 return images of the corresponding users 16-2 through 16-N. Note that while the image acquisition function 32-1 is illustrated herein as being part of the user device 14-1, the image acquisition function 32-1 may alternatively be an external device connected to the user device 14-1 via, for example, a wired connection such as a Universal Serial Bus (USB) or Firewire connection, a local wireless connection such as a Bluetooth® connection, or the like.

The location determination function 34-1 may be implemented in hardware, software, or a combination thereof. In general, the location determination function 34-1 is any hardware device and/or software application that is capable of determining a location of the user device 14-1, and thus the location of the user 16-1. In one embodiment, the location determination function 34-1 is a Global Positioning System (GPS) receiver or similar Satellite Positioning System (SPS) receiver. In another embodiment, the location determination function 34-1 operates to obtain a location of the user device 14-1 from a base station of a cellular telecommunications network. Note that these two exemplary embodiments of the location determination function 34-1 are not intended to limit the scope of the present disclosure. Also, while the location determination function 34-1 is illustrated as being part of the user device 14-1, the location determination function 34-1 may alternatively be an external device connected to the user device 14-1 via, for example, a wired connection such as a USB or Firewire connection, a local wireless connection such as a Bluetooth® connection, or the like. Still further, the image acquisition function 32-1 and the location determination function 34-1 may alternatively be implemented as a GPS-enabled digital camera that is connected to the user device 14-1 via, for example, a wired connection such as a USB or Firewire connection, a local wireless connection such as a Bluetooth® connection, or the like.

Figure 2:
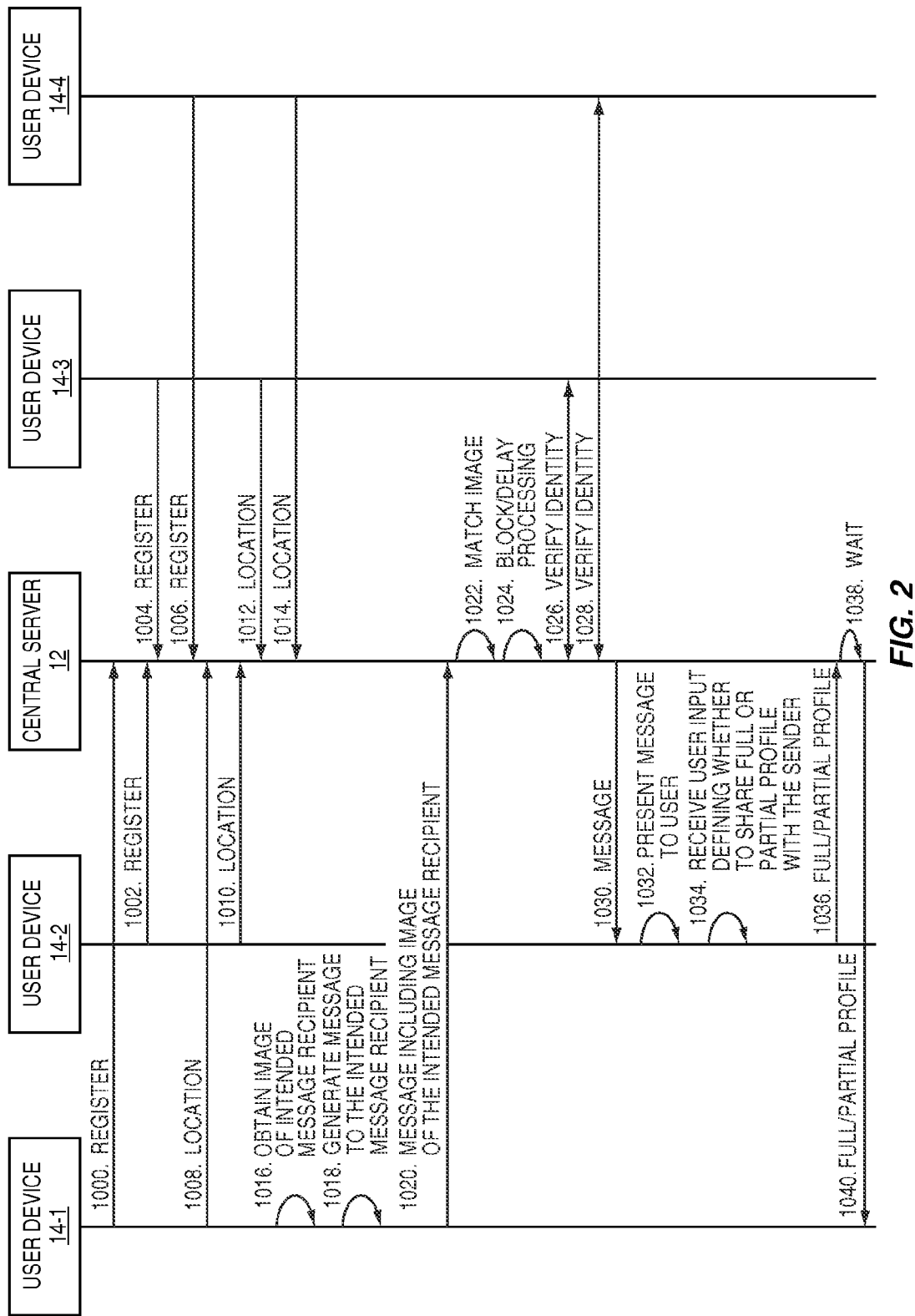
FIG. 2 illustrates the operation of the system of FIG. 1 according to one embodiment of the present disclosure.

FIG. 2 illustrates the operation of the system 10 of FIG. 1 according to one embodiment of the present disclosure. First, the user devices 14-1 through 14-4, or alternatively the users 16-1 through 16-4, register with the central server 12 (steps 1000-1006). During registration, the user accounts 28 of the users 16-1 through 16-4 are created. Again, the user accounts 28 of the users 16-1 through 16-4 include the user profiles and images of the users 16-1 through 16-4, respectively. In addition, the user accounts 28 of the users 16-1 through 16-4 may include friends lists and preferences of the users 16-1 through 16-4, respectively. Using the user 16-1 as an example, the friends list of the user 16-1 may identify one of more of the other users 16-2 through 16-N as friends of the user 16-1. The friends list of the user 16-1 may be defined by the user 16-1 during registration, exported or otherwise obtained from a software application maintaining a list of contacts of the user 16-1 such as, for example, an email application or an instant messaging application, or exported or otherwise obtained from a contact list maintained by the user device 14-1 where, for example, the user device 14-1 is a mobile telephone. In addition or alternatively, the friends list of the user 16-1 may be populated by querying a social networking service such as, for example, MySpace or Facebook for other users that are related to the user 16-1 within a defined number of one or more degrees of separation.

Still further, a more complex scheme may be used to identify the other users in the friends list of the user 16-1. More specifically, a scheme may be used to identify other users from the users 16-2 through 16-N that may be friends of the user 16-1, a confidence level may be assigned to each of the identified users, and, optionally, the user 16-1 may be given some level of control over which of the identified users are included in the friends list of the user 16-1. For example, the central server 12 may process images including the user 16-1 and one or more other users and determine that the one or more other users are friends of the user 16-1 since the user 16-1 and the other users appear in the same image or frequently appear in the same images. These images may be images provided to the central server 12 as part of the message generation and delivery process discussed herein, retrieved from a social networking service such as a social networking website, retrieved from a photo sharing service such as a photo sharing website, or the like. Also, the central server 12 may determine that if, for example, the user 16-1 is closer to one user than another user in a particular image, that the user 16-1 is more likely to be friends with the user being closer to the user 16-1 in the image.

As another example, the central server 12 may identify the friends of the user 16-1 by identifying other users nearby the user 16-1 when an image of the user 16-1 is captured and used to address a message as discussed herein. The profiles of the other users nearby the user 16-1 at the time the image was captured may be used in addition to other information such as information obtained from a social networking service in order to identify the friends of the user 16-1.

Using the user 16-1 again as an example, the preferences of the user 16-1 may include one or more block or delay preferences that operate to either block messages from being delivered to the user 16-1 based on one or more block criteria or cause delivery of the messages to be delayed until one or more defined delay criteria are satisfied. More specifically, the user 16-1 may define one or more block criteria such that messages addressed with the image of the user 16-1 as the intended message recipient are blocked by the central server 12 (i.e., not delivered to the user 16-1) if the one or more block criteria are satisfied. For example, the one or more block criteria may include a criterion that a message is to be blocked if the sender of the message is on a list of blocked users defined by the user 16-1. As another example, the one or more block criteria may include a criterion that a message is to be blocked if the sender of the message is not within a defined maximum social network distance from the user 16-1 in an existing social network (e.g., Facebook social network). As yet another example, the one or more block criteria may include a criterion that a message is to be blocked if a physical distance between the sender and the user 16-1 is greater than a maximum physical distance defined by the user 16-1. As another example, the one or more block criteria may include a criterion that a message is to be blocked if a physical distance between the sender and the user 16-1 is less than a minimum physical distance defined by the user 16-1. As yet another example, the one or more block criteria may include a criterion that a message is to be blocked if an amount of time that has elapsed since the user 16-1 and the sender of the message were last physically proximate to one another (e.g., within a predefined distance from one another) is greater than a maximum amount of time defined by the user 16-1. As another example, the one or more block criteria may include a criterion that a message is to be blocked if an amount of time that has elapsed since the user 16-1 and the sender of the message were last physically proximate to one another (e.g., within a predefined distance from one another) is less than a minimum amount of time defined by the user 16-1.

In a similar manner, the user 16-1 may define one or more delay criteria such that delivery of messages to the user 16-1 is delayed until the one or more delay criteria are satisfied. For example, the one or more delay criteria may include a criterion that message delivery is to be delayed until the physical distance between the user 16-1 and the sender of the message is greater than a minimum distance defined by the user 16-1. As another example, the one or more delay criteria may include a criterion that message delivery is to be delayed such that an amount of time that has elapsed since the user 16-1 and the sender of the message were physically proximate to one another is at least a minimum amount of time defined by the user 16-1.

Next, the user devices 14-1 through 14-4 provide their locations, or location information, to the central server 12 (steps 1008-1014). Using the user device 14-1 as an example, in one embodiment, the facemail client 30-1 (FIG. 1) obtains a location of the user device 14-1 from the location determination function 34-1 and sends the location of the user device 14-1 to the location tracking function 24 of the central server 12. The location may be, for example, GPS coordinates, a street address, or the like. As discussed above, the user devices 14-1 through 14-4 may send their locations to the central server 12 automatically. For example, the user device 14-1 may send an initial location to the central server 12 during registration and thereafter provide periodic updates to the central server 12 or provide updates to the central server 12 as the location of the user device 14-1 changes. As an alternative, the central server 12 may poll the user devices 14-1 through 14-4 for their locations periodically or as otherwise desired. The locations of the user devices 14-1 through 14-4 are stored in the user accounts 28 of the corresponding users 16-1 through 16-4. As discussed above, the current locations of the user devices 14-1 through 14-4 may be stored as the current locations of the users 16-1 through 16-4. In addition, historical records of the locations of the users 16-1 through 16-4 may be stored in the corresponding user accounts 28.

At this point, in this example, the user device 14-1, and more specifically the image acquisition function 32-1, obtains an image of an intended message recipient (step 1016). Note that, at the time of obtaining the image, the user 16-1 may or may not have the present intent to send a message to the intended message recipient. However, the term "intended message recipient" is used as a means for referring to an individual to whom the user 16-1 subsequently generates and sends a message. In an alternative embodiment, the image of the intended message recipient may be obtained from a secondary source. The secondary source may be, for example, a photo sharing website or application, a website, an email attachment of an email from a friend, or the like. In one embodiment, when obtaining the image of the intended message recipient from a secondary source, a location and time of capturing the image are provided in association with the image. For example, the location and time of capturing the image may be provided as metadata (e.g., ID3 tags) associated with the image.

In another alternative embodiment, the image of the intended message recipient may be obtained from the corresponding user device. More specifically, the image acquisition function 32-1 of the user device 14-1 may operate to obtain images of the users 16-2 through 16-N of the user devices 14-2 through 14-N when the user devices 14-2 through 14-N are within a local wireless communication range of the user device 14-1. In this example, assume that the user devices 14-2, 14-3, and 14-4 are within the local wireless communication range of the user device 14-1. Then, in one specific embodiment, the image acquisition function 32-1 may broadcast an image request to the user devices 14-2, 14-3, and 14-4 via local wireless communication. The facemail clients 30-2, 30-3, and 30-4 of the user devices 14-2, 14-3, and 14-4 then obtain images of the corresponding users 16-2, 16-3, and 16-4, respectively, and return those images to the user device 14-1. The facemail clients 30-2, 30-3, and 30-4 may obtain the images of the users 16-2, 16-3, and 16-4 by capturing images of the users 16-2, 16-3, and 16-4 with image capture devices (e.g., digital cameras) of the user devices 14-1, 14-2, and 14-3. Alternatively, the facemail clients 30-2, 30-3, and 30-4 may return the images of the users 16-2, 16-3, and 16-4 from the user profiles of the users 16-2, 16-3, and 16-4 or some other existing source. In another specific embodiment, the facemail clients 30-2, 30-3, and 30-4 periodically broadcast the images of the corresponding users 16-2, 16-3, and 16-4 without needing a request from the user device 14-1.

Next, a message to the intended message recipient is generated (step 1018). More specifically, the user 16-1 may initiate the generation of the message to the intended message recipient and specify a payload for the message. The payload of the message is preferably a text message. However, the present disclosure is not limited thereto. In addition, the user 16-1 addresses the message using the image of the intended message recipient. In one embodiment, image matching is performed based on a portrait of the intended message recipient and portraits of the users 16-1 through 16-N stored in the user accounts 28 of the users 16-1 through 16-N. As such, if the image of the intended message recipient is, for example, a full body shot, cropping or similar processing may be used to select a portrait of the intended message recipient. As used herein, a portrait of a person is an image or picture especially of the head and shoulders of the person. Cropping or similar processing may also be desired where the image of the intended message recipient is to be created or selected from an image including a group of persons.

It should be noted that the exemplary embodiments discussed herein focus on generating and sending a message to a single intended message recipient. However, the message may be addressed to any number of intended message recipients using only or essentially images of the intended message recipients. For example, if a message is to be sent to two intended message recipients, images for those two intended message recipients are obtained and used to address the message.

The user device 14-1, and more specifically the facemail client 30-1, then sends the message including the image of the intended message recipient to the central server 12 (step 1020). Note that preferably, other than the image of the intended message recipient, no other contact information (e.g., email address, username, telephone number, etc.) of the intended message recipient is known by the user 16-1. The message is addressed to the intended message recipient using only or essentially the image of the intended message recipient. The message is not addressed using text or numbers as in traditional messaging systems. Also note that the location and time at which the image of the intended message recipient was captured may also be provided as part of the message or, alternatively, in association with the image of the intended message recipient such as in ID3 tags of the corresponding image file. Similarly, a direction in which the digital capture device used to capture the image of the intended message recipient was pointing at the time of capture of the image of the intended message recipient may also be provided as part of the message or, alternatively, in association with the image of the intended message recipient such as in ID3 tags of the corresponding image file.

Figure 3:
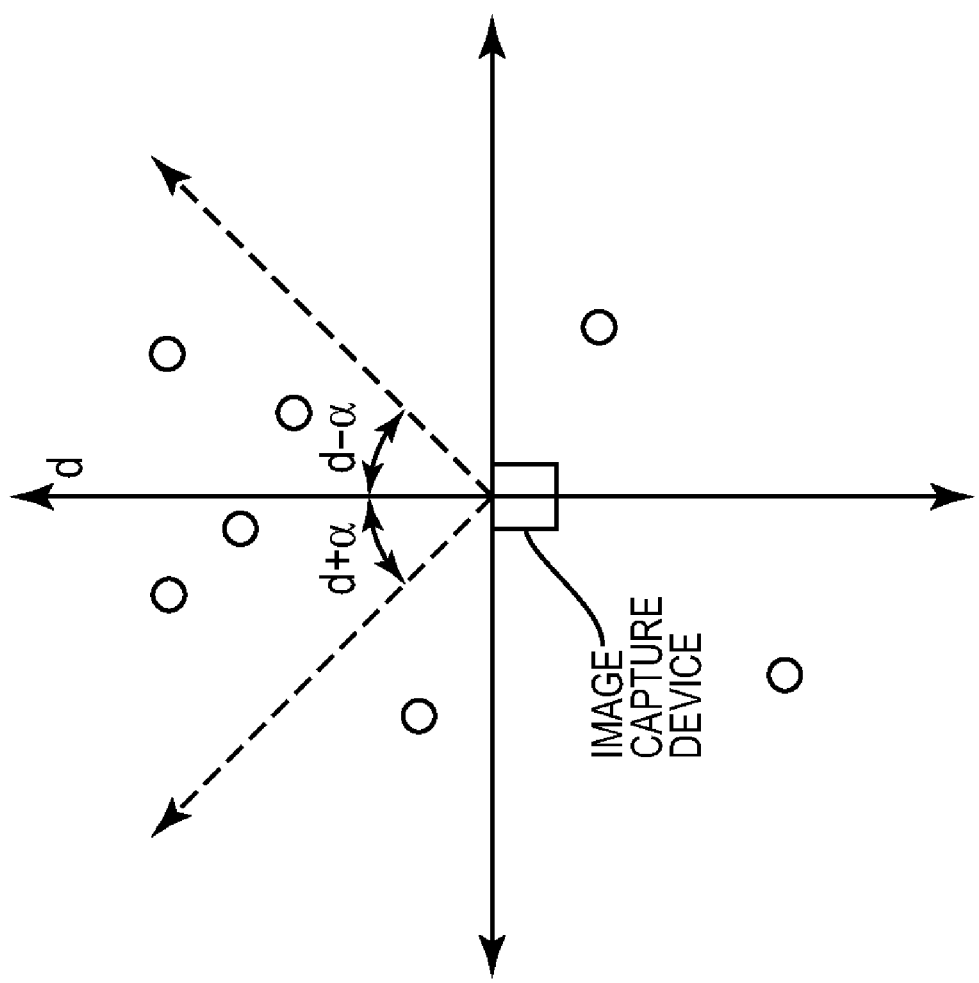
FIG. 3 illustrates a field of view of an image capture device, which may be determined and utilized in an image matching process that identifies an intended message recipient based on an image of the intended message recipient according to one embodiment of the present disclosure.

Upon receiving the message from the user device 14-1, the central server 12 performs an image matching process to identify the intended message recipient (step 1022). More specifically, the facemail delivery function 20 of the central server 12 provides the image of the intended message recipient to the image matching function 22. Then, in one embodiment, the image matching function 22 uses known image matching techniques to match the image of the intended message recipient to the image stored in the user account 28 of one of the users 16-2 through 16-N. In this example, the image matching results in identifying the user 16-2 as the intended message recipient. The image matching function 22 may compare the location and time at which the image of the intended message recipient was captured to the historical location information for the user 16-2 to verify that the user 16-2 was at the location where the image of the intended message recipient was captured at the time the image of the intended message recipient was captured. In addition, the image matching function 22 may utilize the direction in which the image capture device was pointing at the time of capturing the image of the intended message recipient to verify that the user 16-2 was in a field of view of the digital capture device at the time of capture of the image of the intended message recipient. The field of view is preferably the direction (d) in which the image capture device was pointing plus or minus a predefined number of degrees (a), as illustrated in FIG. 3.

Returning to step 1022 of FIG. 2, in another embodiment, the image matching function 22 may first identify a subset of the users 16-2 through 16-N that were at or near the location where the image of the intended message recipient was captured at the time that the image of the intended message recipient was captured. The image matching function 22 may further narrow the subset of the users 16-2 through 16-N using the direction in which the image capture device was pointing at the time of capturing the image of the intended message recipient such that the subset of the users 16-2 through 16-N includes only those users that were at or near the location of capture of the image of the intended message recipient and within the field of view of the image capture device that captured the image of the intended message recipient at the time of capture of the image of the intended message recipient. Then, the image matching function 22 uses known image matching techniques to match the image of the intended message recipient to the image stored in the user account 28 of one of the identified subset of the users 16-2 through 16-N.

Optionally, once the user 16-2 is identified as the intended message recipient, the facemail delivery function 20 of the central server 12 may perform block/delay processing to determine whether to block or delay the message based on the preferences of the user 16-2 (step 1024). As discussed above, in one embodiment, the preferences of the user 16-2 include one or more block criteria. Using the block criteria, the facemail delivery function 20 determines whether to block the message from being delivered to the user 16-2. If so, the facemail delivery function 20 may discard the message and optionally notify the sending user 16-1. In another embodiment, the preferences of the user 16-2 include one or more delay criteria. Using the delay criteria, the facemail delivery function 20 determines whether to delay delivery to the user 16-2. If so, the facemail delivery function 20 delays delivery of the message by an amount of time that may be either a static system defined value or an amount of time defined by the delay criteria.

Next, assuming that the message is not blocked and after any delay has expired, the facemail delivery function 20 may interact with friends of the user 16-2 to verify that the user 16-2 is the intended message recipient (steps 1026 and 1028). In this example, the users 16-3 and 16-4 of the user devices 14-3 and 14-4, respectively, are identified in the friends list of the user 16-2. In one embodiment, verification is performed by sending, to the friends of the user 16-2, the image of the intended message recipient and a line-up including the image of the user 16-2 from the user account 28 of the user 16-2 as well as images of one or more additional users from the users 16-3 through 16-N most closely matching the image of the intended message recipient. The friends of the user 16-2, which in this example are the users 16-3 and 16-4, then select the image from the line-up that matches the image of the intended message recipient. If the user 16-2 is verified as the intended message recipient, the process continues. Otherwise, the central system 12 may return an error message to the user 16-1 at the user device 14-1. Alternatively, if the friends of the user 16-2 select another user from the line-up as matching the image of the intended message recipient, the central server 12 may identify that user as the intended message recipient. Note that the central server 12 may periodically or on occasion send out test verification messages to the friends of the users 16-1 through 16-N in order to ensure that the friends are providing appropriate feedback. Preferably, the test messages would appear to the friends as if the messages were real verification messages. Note that steps 1026 and 1028 are optional. Further, if the message is to be delayed, steps 1026 and 1028 may alternatively be performed before the delay has expired.

Assuming that the user 16-2 is verified as the intended message recipient, the facemail delivery function 20 of the central server 12 then sends the message to the user device 14-2 of the user 16-2 (step 1030). More specifically, once the user 16-2 is identified as the intended message recipient, the central server 12 may obtain contact information for the user 16-2 from the user account 28 of the user 16-2. The contact information may be, for example, an email address of the user 16-2, an instant messaging username of the user 16-2, a telephone number to be used for text messaging, contact information such as a username used specifically for delivering messages in the system 10 (i.e., a facemail ID), or the like. Using the contact information of the user 16-2, the facemail delivery function 20 then sends the message to the user 16-2 at the user device 14-2. Note that the central server 12 may alternatively deliver the message to the user 16-2 at the user device 14-2 using a web interface. For example, the user 16-2 may log into the web interface in a manner similar to current web-based email interfaces such as Yahoo!® Mail. Once the user 16-2 is logged in, the message may be presented to the user 16-2 at the user device 14-2 via the web interface.

Once the message is received at the user device 14-2, the facemail client 30-2 presents the message to the user 16-2 at the user device 14-2 (step 1032). The message may be presented automatically or upon request by the user 16-2. The user profile, including the contact information, of the user 16-1 may or may not be available to the user 16-2 at this time. At this point, the facemail client 30-2 may receive user input from the user 16-2 defining whether the full profile of the user 16-2 or a partial profile of the user 16-2, if any, is to be sent to the user 16-1 (step 1034). In one embodiment, the partial user profile is a select subset of the user profile of the user 16-2 in the user account 28 of the user 16-2 and may be system-defined, defined by the user 16-2, or selected by the user 16-2 in response to receiving the message. If the user 16-2 chooses to reveal his or her full or partial user profile to the user 16-1, the facemail client 30-2 sends the full or partial profile to the central server 12 for delivery to the user 16-1 at the user device 14-1 or instructs the central server 12 to provide the full or partial user profile of the user 16-2 to the user 16-1 at the user device 14-1 (step 1036).

At this point, in one embodiment, the preferences of the user 16-1 in the user profile of the user 16-1 may include one or more response delay criteria, and the facemail delivery function 20 delays delivery of the full or partial profile of the user 16-2 to the user 16-1 in accordance with the one or more response delay criteria (step 1038). The one or more response delay criteria define an amount of time to delay delivery of the full or partial profile of the user 16-2 to the user 16-1 once the user 16-2 has approved sharing of his or her full or partial profile with the user 16-1. For example, the one or more response delay criteria may include a criterion that the full or partial profile of the user 16-2 is not to be returned to the user 16-1 until the physical distance between the users 16-1 and 16-2 is greater than a minimum distance defined by the user 16-1. As another example, the one or more response delay criteria may include a criterion that the full or partial profile of the user 16-2 is not to be returned to the user 16-1 until at least a minimum amount of time defined by the user 16-1 has expired since the users 16-1 and 16-2 where physically proximate to one another.

Lastly, the full or partial user profile of the user 16-2 is then sent to the user device 14-1 of the user 16-1, and presented to the user 16-1 (step 1040). While not shown, at this point, the user 16-1 may choose to reveal his or her full or partial user profile to the user 16-2 if this information was not previously provided to the user 16-2 in the message or in association with the message.

Note that the user 16-2 may choose to respond to the message in addition to or as an alternative to revealing his or her full or partial profile to the user 16-1. If the message delivered in step 1030 includes the contact information of the user 16-1 or if the contact information is provided in association with the message delivered in step 1030, any message sent from the user 16-2 to the user 16-1 in response to the message delivered in step 1030 may be provided directly from the user device 14-2 to the user device 14-1 of the user 16-1 using the appropriate communication system. For example, if the contact information provided for the user 16-1 is the email address of the user 16-1, the response message may be provided by the appropriate email system. However, if the contact information of the user 16-1 is not included in the message or is not provided in association with the message, any message sent from the user 16-2 to the user 16-1 in response to the message delivered in step 1030 may first be provided to the central server 12. The central server 12 may then deliver the response message to the user device 14-1 of the user 16-1.

Figure 4:
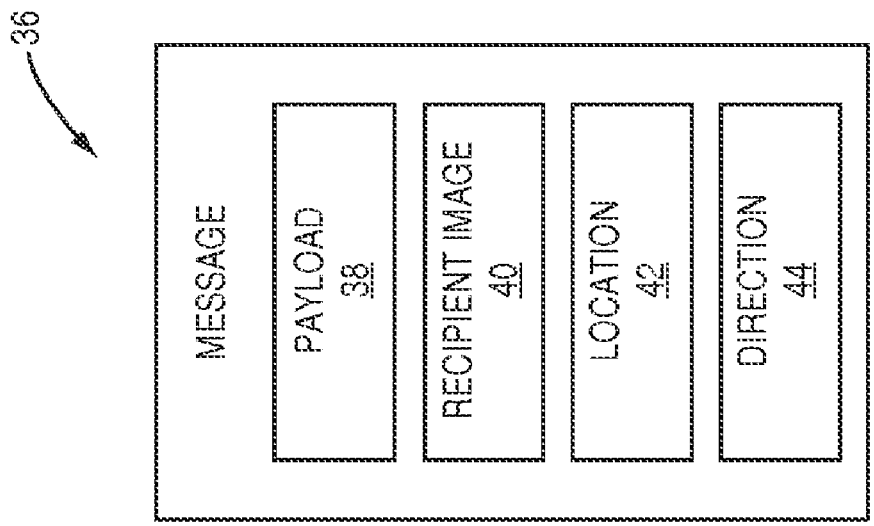
FIG. 4 illustrates an exemplary embodiment of the message sent in FIG. 2.

FIG. 4 illustrates an exemplary message 36 generated by the facemail client 30-1 and sent to the central server 12 for delivery to the intended message recipient according to one embodiment of the present disclosure. In this embodiment, the message 36 includes a payload 38. As discussed above, the payload 38 is preferably a text message provided by the user 16-1. However, the payload 38 is not limited thereto. For example, the payload 38 may additionally or alternatively include a video message created by the user 16-1, a video clip selected by the user 16-1, a picture of the user 16-1, a picture selected by the user 16-1, or the like. The message 36 also includes a recipient image 40, which is an image of the intended message recipient, and a location 42 at which the recipient image 40 was captured. Note that, preferably, a time at which the image was captured is stored as metadata in association with the recipient image 40. For example, the time at which the recipient image 40 was captured may be stored as a tag within the corresponding image file. Lastly, the message 36 may include a direction 44 in which the image capture device was pointing at the time of capture of the recipient image 40. The direction 44 in which the image capture device was pointing may be obtained from an associated digital compass or similar device, which may be incorporated into the user device 14-1.

FIG. 5 illustrates the operation of the system 10 of FIG. 1 according to another embodiment of the present disclosure. This embodiment is substantially the same as that shown in FIG. 2. However, a question and reward scheme is used to reveal a reward to the intended message recipient in response to the intended message recipient answering a number of questions. First, the user devices 14-1 through 14-4, or alternatively the users 16-1 through 16-4, register with the central server 12 (steps 2000-2006). As discussed above, during registration, the user accounts 28 of the users 16-1 through 16-4 are created. Next, the user devices 14-1 through 14-4 provide their locations, or location information, to the central server 12 (steps 2008-2014). Again, the user devices 14-1 through 14-4 may send their locations to the central server 12 automatically. As an alternative, the central server 12 may poll the user devices 14-1 through 14-4 for their locations periodically or as otherwise desired. The locations of the user devices 14-1 through 14-4 are stored in the user accounts 28 of the corresponding users 16-1 through 16-4. The current locations of the user devices 14-1 through 14-4 may be stored as the current locations of the users 16-1 through 16-4. In addition, historical records of the locations of the users 16-1 through 16-4 may be stored in the corresponding user accounts 28. At this point, in this example, the user device 14-1, and more specifically the image acquisition function 32-1, obtains an image of an intended message recipient (step 2016). As discussed above, in an alternative embodiment, the image of the intended message recipient may be obtained from an alternative source such as, for example, a photo sharing website or application, a website, an email attachment of an email from a friend, the corresponding user device of the intended message recipient, or the like.

Next, a message to the intended message recipient is generated (step 2018). More specifically, the user 16-1 may initiate the generation of the message to the intended message recipient and specify a payload for the message. The payload of the message is preferably a text message. However, the present disclosure is not limited thereto. In addition, the user 16-1 addresses the message using the image of the intended message recipient. As discussed above, in one embodiment, cropping or similar processing may be utilized to provide the image of the intended message recipient as a portrait of the intended message recipient.

In addition, in this embodiment, the user 16-1 defines a number of questions to ask the intended message recipient as well as a reward to be revealed to the intended message recipient upon answering the questions. More specifically, the user 16-1 may create the questions, select the questions from a predefined group of questions created by the user 16-1, select the questions from a group of system-defined questions, or the like. In one embodiment, each question includes the question body or text, a point value assigned to the question by the user 16-1, and possible answers to the question if the question is a multiple choice question. As discussed below, the point values assigned to the questions may be used to control revealing of the reward. The reward may be, for example, a picture of the user 16-1 sending the message, a full or partial profile of the user 16-1 sending the message, contact information for the user 16-1 sending the message, or the like.

The user device 14-1, and more specifically the facemail client 30-1, then sends the message including the image of the intended message recipient, the questions, and the reward information to the central server 12 (step 2020). Note that preferably, other than the image of the intended message recipient, no other contact information (e.g., email address, username, telephone number, etc.) of the intended message recipient is known by the user 16-1. The message is addressed to the intended message recipient using only or essentially the image of the intended message recipient. Also note that the location and time at which the image of the intended message recipient was captured may also be provided as part of the message or, alternatively, in association with the image of the intended message recipient such as in ID3 tags of the corresponding image file. Similarly, a direction in which the digital capture device used to capture the image of the intended message recipient was pointing at the time of capture of the image of the intended message recipient may also be provided as part of the message or, alternatively, in association with the image of the intended message recipient such as in ID3 tags of the corresponding image file.

As discussed above, upon receiving the message from the user device 14-1, the central server 12 performs an image matching process to identify the intended message recipient (step 2022). In this example, the user 16-2 again is identified as the intended message recipient. Optionally, once the user 16-2 is identified as the intended message recipient, the facemail delivery function 20 of the central server 12 may perform block/delay processing to determine whether to block or delay the message based on the preferences of the user 16-2 (step 2024). Next, assuming that the message is not blocked and after any delay has expired, the facemail delivery function 20 of the central server 12 may interact with friends of the user 16-2 to verify that the user 16-2 is the intended message recipient (steps 2026 and 2028). In this example, the users 16-3 and 16-4 of the user devices 14-3 and 14-4, respectively, are identified in the friends list of the user 16-2. Assuming that the user 16-2 is verified as the intended message recipient, the facemail delivery function 20 of the central server 12 then sends the message to the user device 14-2 of the user 16-2 (step 2030).

Once the message is received at the user device 14-2, the facemail client 30-2 presents the message to the user 16-2 at the user device 14-2 (step 2032). The message may be presented automatically or upon request by the user 16-2. Either before, during, or after the message is presented to the user 16-2, the facemail client 30-2 presents the questions provided by the user 16-1 to the user 16-2. Thereafter, the facemail client 30-2 receives user input from the user 16-2 defining answers to the questions (step 2034). As the answers are received, the facemail client 30-2 reveals the reward (step 2036). More specifically, in one embodiment, when the user 16-2 answers a question, the facemail client 30-2 reveals the reward according to the point value assigned to the question or alternatively the point value assigned to the particular answer to the question given by the user 16-2. For example, as discussed below, the reward may be an image of the user 16-1 such as the image of the user 16-1 stored in the user account 28 of the user 16-1. At first, the image of the user 16-1 is completely distorted. After the user 16-2 answers a first question, the image of the user 16-1 becomes less distorted. As the user 16-2 continues to answer the questions, the image of the user 16-1 continues to become less distorted until finally the image of the first user 16-1 is no longer distorted. Note that, in one embodiment, the questions are assigned point values such that, regardless of the answers given by the user, the image of the user 16-1 will no longer be distorted after all of the questions are answered by the user 16-1. In another embodiment, particular answers to the questions are assigned different point values such that the image of the user 16-1 may remain completely or partially distorted depending on the particular answers given by the user 16-2. In this example, a summary of the answers given by the user 16-2 is returned to the central server 12 (step 2038). The central server 12 then forwards the summary of the answers to the user device 14-1 of the user 16-1 (step 2040).

In addition to the user input from the user 16-2 answering the questions, the facemail client 30-2 may receive user input from the user 16-2 defining whether the full profile of the user 16-2 or a partial profile of the user 16-2, if any, is to be sent to the user 16-1 (step 2042). If the user 16-2 chooses to reveal his or her full or partial user profile to the user 16-1, the facemail client 30-2 sends the full or partial profile to the central server 12 for delivery to the user 16-1 at the user device 14-1 or instructs the central server 12 to provide the full or partial user profile of the user 16-2 to the user 16-1 at the user device 14-1 (step 2044).

At this point, in one embodiment, the preferences of the user 16-1 in the user profile of the user 16-1 may include one or more response delay criteria, and the facemail delivery function 20 delays delivery of the full or partial profile of the user 16-2 to the user 16-1 in accordance with the one or more response delay criteria (step 2046). The full or partial user profile of the user 16-2 is then sent to the user device 14-1 of the user 16-1, and presented to the user 16-1 (step 2048). Note that, in an alternative embodiment, the user 16-2 may choose to reveal his or her full or partial profile to the user 16-1 as a reward in response to answering one or more questions. While not shown, at this point, the user 16-1 may choose to reveal his or her full or partial user profile to the user 16-2 if this information was not previously provided to the user 16-2 in the message, in association with the message, or as the reward.

Note that the user 16-2 may choose to respond to the message in addition to or as an alternative to revealing his or her full or partial profile to the user 16-1. If the message delivered in step 2030 includes the contact information of the user 16-1 or if the contact information is provided in association with the message delivered in step 2030, any message sent from the user 16-2 to the user 16-1 in response to the message delivered in step 2030 may be provided directly from the user device 14-2 to the user device 14-1 of the user 16-1 using the appropriate communication system. For example, if the contact information provided for the user 16-1 is the email address of the user 16-1, the response message may be provided by the appropriate email system. However, if the contact information of the user 16-1 is not included in the message or is not provided in association with the message, any message sent from the user 16-2 to the user 16-1 in response to the message delivered in step 2030 may first be provided to the central server 12. The central server 12 may then deliver the response message to the user device 14-1 of the user 16-1.

Figure 6:
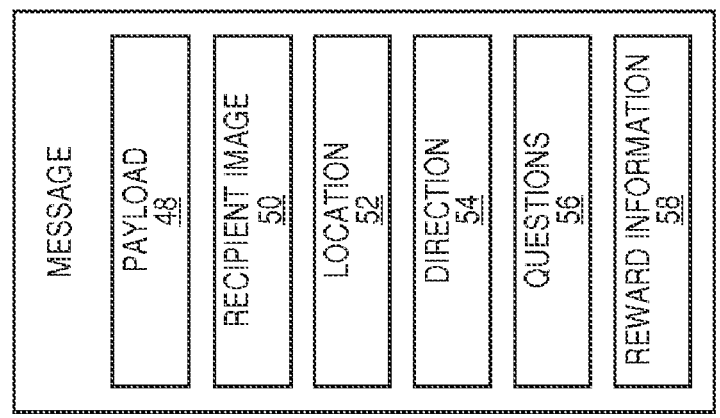
FIG. 6 illustrates an exemplary embodiment of the message sent in FIG. 5.
Figure 10:
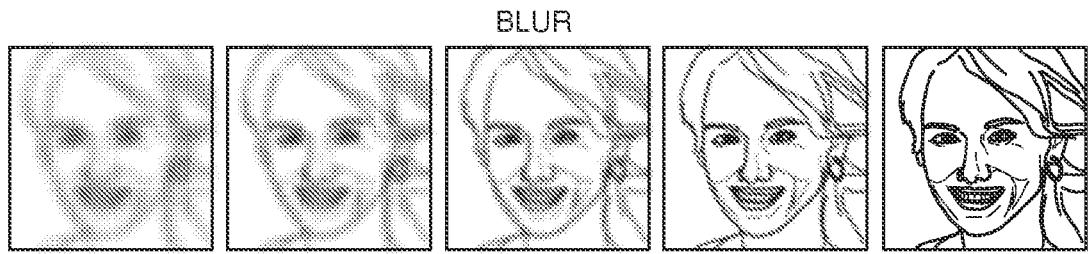
FIGS. 10 through 14 illustrate reward states for additional exemplary distortion algorithms.
Figure 11:
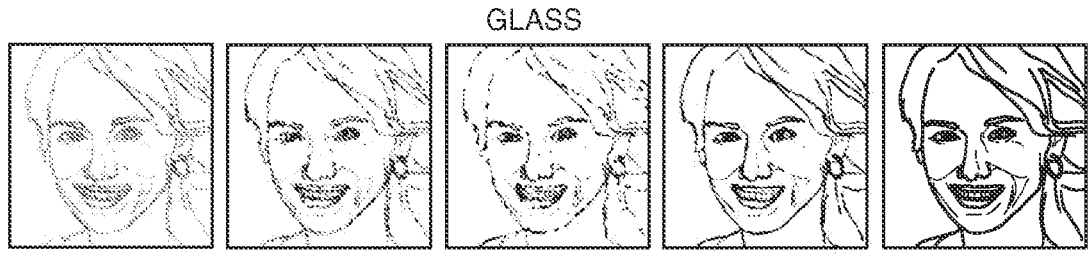
Figure 12:
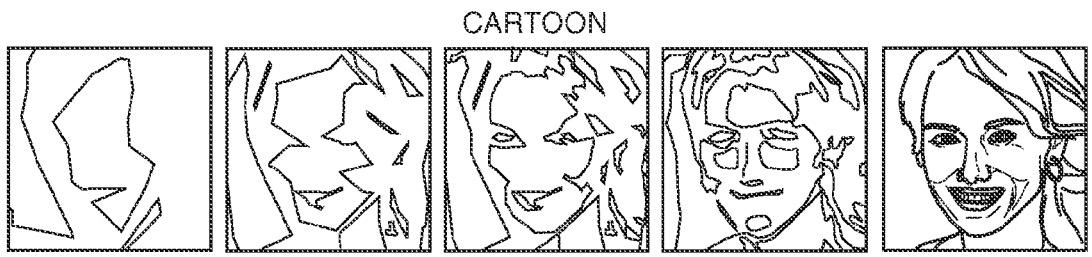
Figure 13:
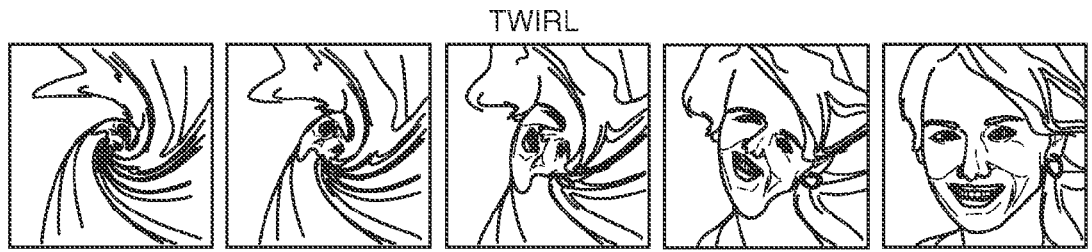
Figure 14:
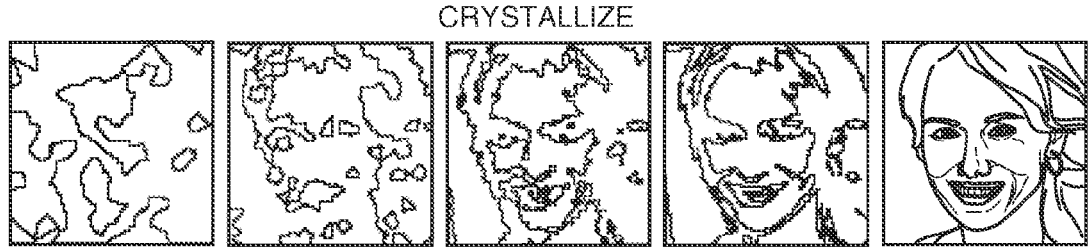

FIG. 6 illustrates an exemplary message 46 generated by the facemail client 30-1 and sent to the central server 12 for delivery to the intended message recipient according to the embodiment of the present disclosure discussed above with respect to FIG. 5. In this embodiment, the message 46 includes a payload 48. The payload 48 is preferably a text message provided by the user 16-1. However, the payload 48 is not limited thereto. For example, the payload 48 may additionally or alternatively include a video message created by the user 16-1, a video clip selected by the user 16-1, a picture of the user 16-1, a picture selected by the user 16-1, or the like. The message 46 also includes a recipient image 50, which is an image of the intended message recipient, and a location 52 at which the recipient image 50 was captured. Note that, preferably, a time at which the image was captured is stored as metadata in association with the recipient image 50. For example, the time at which the recipient image 50 was captured may be stored as a tag within the corresponding image file. The message 46 may also include a direction 54 in which the image capture device was pointing at the time of capture of the recipient image 50. The direction 54 in which the image capture device was pointing may be obtained from an associated digital compass or similar device, which may be incorporated into the user device 14-1. In addition, the message 46 of this embodiment includes questions 56 and reward information 58.

Figure 7:
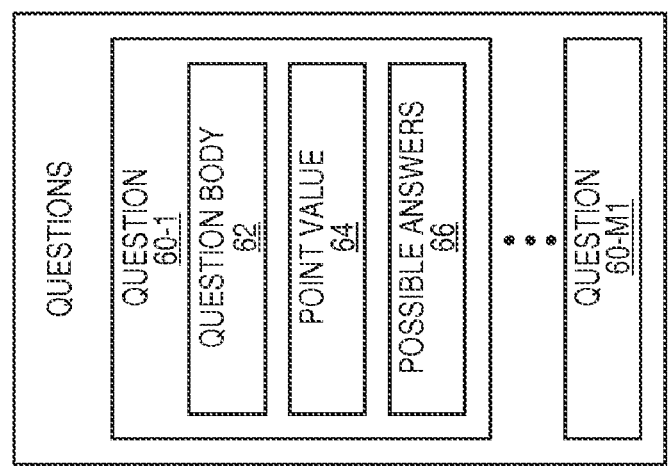
FIG. 7 illustrates an exemplary embodiment of the questions contained in the message of FIG. 6.

FIG. 7 illustrates an exemplary embodiment of the questions 56 of FIG. 6. In general, the questions 56 include a number of questions 60-1 through 60-M1. Note that there may be any number of one or more questions. The question 60-1 includes a question body 62, a point value 64, and optionally a list of possible answers 66. The question body 62 includes the text forming the question. For example, the question body 62 may provide the text "Who is your favorite music artist or band?" The point value 64 is a point value assigned to the question 60-1. The point value 64 is preferably assigned to the question 60-1 by the user asking the question, which, in the example above, is the user 16-1. Alternatively, the point value 64 may be system-defined. The question 60-1 may also include a list of possible answers 66. For example, if the question 60-1 is a multiple choice question, the list of possible answers 66 includes answers for the multiple choice question. Note that, if there is a list of possible answers 66, the user asking the question may assign different point values to each of the possible answers. In this manner, the reward may be revealed differently depending on the answers given by the intended message recipient. Alternatively, one or more desired answers to the question 60-1 may be defined. Different point values may be assigned to the desired answers as compared to any other answer such that the reward is revealed differently depending on whether the intended message recipient gives a desired answer as opposed to any other answer. Similarly, while not illustrated, the questions 60-2 through 60-M1 each include a question body, a point value, and possible answers.

Figure 8:
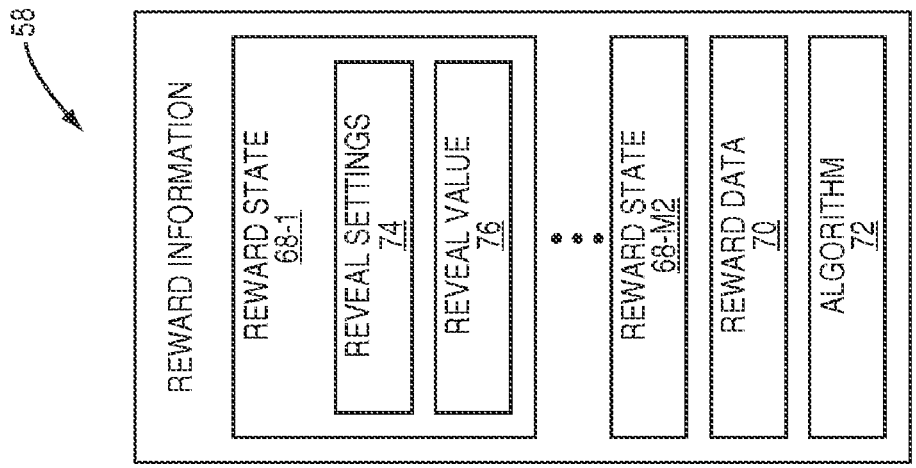
FIG. 8 illustrates an exemplary embodiment of the reward information contained in the message of FIG. 6.

FIG. 8 illustrates an exemplary embodiment of the reward information 58 of FIG. 6. The reward information 58 includes a number of reward states 68-1 through 68-M2, reward data 70, and an algorithm 72 for revealing the reward data 70 according to the reward states 68-1 through 68-M2. The reward states 68-1 through 68-M2 each include reveal settings 74 and a reveal value 76. The reveal settings 74 and the reveal value 76 are inputs to the algorithm 72 to control the revealing of the reward data 70. The selection of the reward state 68-1 through 68-M2 is preferably controlled based on the point value 64 or an accumulated point value for the questions 60-1 through 60-M1 answered by the intended message recipient.

In one embodiment, the number of reward states M2 is equal to a total number of points that may be accumulated by answering the questions 60-1 through 60-M1. In one embodiment, the total number of points that may be accumulated is the sum of the point values 64 of the questions 60-1 through 60-M1. The reveal values 76 of the reward states 68-1 through 68-M2 correspond to potential accumulated point values. For example, if the total number of points that may be accumulated by answering the questions 60-1 through 60-M1 is ten (10), then there may be eleven (11) reward states 68-1 through 68-11 with reveal values 76 of zero (0) through (10), respectively. The reveal settings 74 of the reward states 68-1 through 68-11 are inputs to the algorithm 72 and control the revealing of the reward data 70. Thus, if the reward data 70 is an image of the sender of the message, the algorithm 72 may be an algorithm for distorting the image. The reveal settings 74 for each reward state 68-1 through 68-11 control the amount of distortion, with the reward state 68-1 causing a maximum distortion, the reward state 68-11 causing a minimum or no distortion, and the reward states 68-2 through 68-10 causing intermediate levels of distortion. Thus, before any questions are answered by the intended message recipient, the reward is in the reward state 68-1 such that the image, or reward data 70, is presented with a maximum amount of distortion. After the intended message recipient answers the first question 60-1, the point value 64 for the first question 60-1 is used to select one of the reward states 68-1 through 68-11 having a reveal value 76 corresponding to the point value 64 of the first question 60-1. After the intended message recipient answers the second question 60-2, the sum of the point values 64 of the first and second questions 60-1 and 60-2 is used to select one of the reward states 68-1 through 68-11 having a reveal value 76 corresponding to the sum of the point values 64 of the first and second questions 60-1 and 60-2. The process continues to reveal the reward data 70 as the intended message recipient answers the questions 60-1 through 60-10.

FIG. 9A illustrates the reveal settings 74 in an embodiment where there are three reward states 68-1 through 68-3, the reward data 70 is an image, and the algorithm 72 is an algorithm for scrambling or distorting the image. As shown, the image is divided into a number of blocks numbered one (1) through sixteen (16). The reveal settings 74 provide the arrangement of the blocks of the image. The corresponding versions of the image, or reward data 70, provided by the algorithm 72 for each of the reward states 68-1 through 68-3 are illustrated in FIG. 9B. As shown, in the reward state 68-1, the image is severely distorted. In the reward state 68-2, the image is less distorted. Lastly, in the reward state 68-3, the image is non-distorted or has no distortion. FIGS. 10 through 14 illustrate exemplary alternative algorithms for distorting the image of FIG. 9B. Note that the examples given above with respect to FIGS. 9A, 9B, and 10 through 14 are exemplary and are not intended to limit the scope of the present disclosure.

FIGS. 15A through 15I graphically illustrate the process of FIG. 5 according to one embodiment of the present disclosure. For this example, again assume that the user 16-1 is the user sending the message, the user 16-2 is identified as the intended message recipient, and that users 16-3 and 16-4 are friends of the user 16-2. FIG. 15A illustrates an initial state after the user 16-1 has obtained an image 78. In this example, the image 78 is an image of a group of users. In order to create an image of the intended message recipient, the user 16-1 selects an "isolate face" button 80 in order to initiate a cropping process. As shown in FIG. 15B, in response to user input from the user 16-1 selecting the "isolate face" button 80, the user 16-1 is enabled to control a selection tool 82 in order to select the intended message recipient from the image 78. After positioning the selection tool 82, the user 16-1 selects a "finish" button 84. In response, the image of the intended message recipient is created.

Next, as shown in FIG. 15C, the image of the intended message recipient is then presented to the user 16-1. The user 16-1 may then select a "create message" button 86 in order to initiate the process of creating a message to be sent to the intended message recipient. As shown in FIG. 15D, in this example, the user 16-1 then creates a text message to be provided as the payload of the message to be sent to the intended message recipient. A "clear" button 88 enables the user 16-1 to clear the message. Once the text message is complete, the user 16-1 may select a "next" button 90 to proceed to the next step. As shown in FIG. 15E, in this example, the next step is for the user 16-1 to select a manner in which the reward data, which in this example is an image of the user 16-1, is to be revealed to the intended message recipient. The manner in which the reward data is to be revealed corresponds to the algorithm to be used to reveal the reward data. In this example, the user 16-1 may choose to blur his or her image, apply a cartoon effect to his or her image, apply a glass effect to his or her image, apply a twirl effect to his or her image, or the like. In addition, in this example, the user 16-1 may select a "select style of reward data" button 92 in order to change the style, or type, of reward data. For example, the user 16-1 may choose to switch the reward data from being an image of the user 16-1 to being a full or partial profile of the user 16-1. The user 16-1 may then select a "send message" button 94 to send the message. Note that, while not shown, the user 16-1 may also be enabled to create or select questions to be asked in order to reveal the image of the user 16-1 to the intended message recipient, as discussed above.

After the message is sent, the central server 12 performs an image matching process to identify the intended message recipient, as discussed above. In this example, the intended message recipient is identified as the user 16-2, where the user 16-2 has a username "Naomi123." As shown in FIG. 15F, the central server 12 then sends the image of the intended message recipient as well as a line-up 96 of the images from the user accounts 28 of the user 16-2 and other users from the users 16-3 through 16-N that most closely match the image of the intended message recipient to the friends of the user 16-2. In order to verify the intended message recipient, each friend selects an image from the line-up 96 matching the image of the intended message recipient and selects a "verify" button 98. If the image selected by the friend is the image of the user 16-2, then the user 16-2 is verified as the intended message recipient. The friend may also be enabled to respond to the user 16-1 sending the message, which in this example has the username "Hal101," by selecting a "respond to Hal101" button 100. The friend may also be enabled to send a warning message to the intended message recipient, which is the user 16-2, by selecting a "send warning to Naomi123" button 102.

As illustrated in FIG. 15G, once verification is complete, the central server 12 sends the message including the questions to be asked in order to reveal the reward data to the user device 14-2 of the intended message recipient, which is the user 16-2. The user 16-2 may choose to answer the questions by selecting an "answer questions" button 104 or decline to answers the questions by selecting a "decline" button 106. Assuming that the user 16-2 has chosen to answer the questions, the image of the user 16-1 is revealed as the user 16-2 answers the questions, as illustrated in FIG. 15H. Also, the user 16-2 may choose to reveal her full profile to the user 16-1 by selecting a "reveal full profile" button 108 or reveal her partial profile to the user 16-1 by selecting a "reveal partial profile" button 110. In this example, the user 16-2 has chosen to share her partial profile with the user 16-1, where the partial profile includes the image of the user 16-2 from the user account 28 of the user 16-2, as illustrated in FIG. 15I. While not illustrated, in one embodiment, upon choosing to share her partial profile with the user 16-1, the user 16-2 may be presented with the option to reveal her partial profile to the user 16-1 now or to wait until one or more response delay criteria are satisfied. The response delay criteria may be included in the user profile of the user 16-2 stored at the central server 12 or may be configured by the user 16-2 at this point through the illustrated Graphical User Interface (GUI). Alternatively, any such delay may be automatically performed by the central server 12 if the user 16-2 has defined one or more response delay criteria in her user profile.

Returning to FIG. 15I, at this point, the user 16-1 may then choose to respond to the user 16-2 by selecting a "respond to Naomi123" button 112. Preferably, at this point, the users 16-1 and 16-2 have exchanged contact information and may communicate via traditional communication means such as email, instant messaging, text messaging, a telephone call, or the like. Alternatively, the central server 12 may continue to enable communication between the users 16-1 and 16-2 where messages are addressed using, for example, the usernames of the users 16-1 and 16-2.

FIG. 16 illustrates the operation of the system 10 according to another embodiment of the present disclosure. In this embodiment, an image of the user at the recipient user device is returned to the sending user device before the message is delivered such that the sending user is enabled to authenticate that the user at the recipient user device is in fact the intended message recipient before the message is delivered. At the point that this process begins, the users 16-1 through 16-N, or the user devices 14-1 through 14-N, have registered with the central server 12 and have reported their current locations to the central server 12 in a manner similar to that described above with respect to steps 1000-1014 of FIG. 2.

First, the user device 14-1, and more specifically the image acquisition function 32-1, obtains an image of an intended message recipient (step 3000). As discussed above, in one embodiment, the image acquisition function 32-1 is or includes an image capture device, and the image of the intended message recipient is obtained by capturing an image of the intended message recipient via the image capture device. As discussed above, in an alternative embodiment, the image of the intended message recipient may be obtained from an alternative source such as, for example, a photo sharing website or application, a website, an email attachment of an email from a friend, the corresponding user device of the intended message recipient, or the like.

Next, a message to the intended message recipient is generated (step 3002). More specifically, the user 16-1 may initiate the generation of the message to the intended message recipient and specify a payload for the message. The payload of the message is preferably a text message. However, the present disclosure is not limited thereto. In addition, the user 16-1 addresses the message using the image of the intended message recipient. The user device 14-1, and more specifically the facemail client 30-1, then sends the message including the image of the intended message recipient to the central server 12 (step 3004). Note that preferably, other than the image of the intended message recipient, no other contact information (e.g., email address, username, telephone number, etc.) of the intended message recipient is known by the user 16-1. The message is addressed to the intended message recipient using only or essentially the image of the intended message recipient. The message is not addressed using text or numbers as in traditional messaging systems. Also note that the location and time at which the image of the intended message recipient was captured may also be provided as part of the message or, alternatively, in association with the image of the intended message recipient such as in ID3 tags of the corresponding image file. Similarly, a direction in which the digital capture device used to capture the image of the intended message recipient was pointing at the time of capture of the image of the intended message recipient may also be provided as part of the message or, alternatively, in association with the image of the intended message recipient such as in ID3 tags of the corresponding image file.

Upon receiving the message from the user device 14-1, the central server 12 performs an image matching process to identify the intended message recipient, as described above with respect to, for example, step 1022 of FIG. 2 (step 3006). In this example, the user 16-2 is identified as the intended message recipient. Optionally, once the user 16-2 is identified as the intended message recipient, the facemail delivery function 20 of the central server 12 may perform block/delay processing to determine whether to block or delay the message based on the preferences of the user 16-2, as described above with respect to, for example, step 2024 of FIG. 2 (step 3008).

Next, assuming that the message is not blocked and after any delay has expired, the facemail delivery function 20 sends an authentication request to the user device 14-2 of the user 16-2 (step 3010). Notably, the authentication request is performed prior to delivery of the message to the user 16-2. In response to the authentication request, the facemail client 30-2 of the user device 14-2 obtains an image of the user 16-2 of the user device 14-2 from the image acquisition function 32-2 of the user device 14-2 (step 3012). In one embodiment, the user device 14-2 is a mobile device (e.g., a mobile telephone), and the image acquisition function 32-2 includes a back-facing digital camera. In this case, the back-facing digital camera captures an image of the user 16-2 of the user device 14-2 preferably without the knowledge of the user 16-2. This would prevent a nefarious user from pointing the back-facing camera at the real intended message recipient in order to gain access to the actual intended message recipient's message. In order to capture the image of the user 16-2 without the knowledge of the user 16-2, the user device 14-2 may wait until the user 16-2 is within the field of view of the back-facing digital camera before attempting to capture the image of the user 16-2. The user device 14-2 may detect when the user 16-2 is within the field of view of the back-facing digital camera by, for example, detecting when the user 16-2 is viewing the display of the mobile device (e.g., detecting when the user 16-2 is interacting with a GUI presented on the display of the mobile device), analyzing the output of the digital camera, or the like. In another embodiment, the image acquisition function 32-2 may obtain the image of the user 16-2 of the user device 14-2 from the user profile of the user 16-2, a copy of which may be stored locally at the user device 14-2.

Optionally, the facemail client 30-2 then confirms that the user 16-2 desires to authenticate himself to the user 16-1 (step 3014). Assuming that the user 16-2 approves authentication (or that no approval for authentication is requested), the facemail client 30-2 of the user device 14-2 sends the image of the user 16-2 of the user device 14-2 to the central server 12 (step 3016). In this embodiment, in order to perform authentication, the facemail delivery function 20 of the central server 12 then sends the image of the user 16-2 of the user device 14-2 to the user device 14-1 (step 3018). The facemail client 30-1 of the user device 14-1 then authenticates that the user 16-2 of the user device 14-2 is the intended message recipient (step 3020). More specifically, the facemail client 30-1 presents the image of the user 16-2 and requests confirmation from the user 16-1 that the user 16-2 is in fact the intended message recipient. Once the user 16-1 confirms that the user 16-2 is in fact the intended message recipient, the facemail client 30-1 sends authentication to the facemail delivery function 20 of the central server 12 (step 3022).

Note that steps 3018 through 3022 are exemplary. Other techniques may be used to authenticate that the user 16-2 of the user device 14-2 is in fact the intended message recipient based on the image of the user 16-2. For example, in an alternative embodiment, the facemail delivery function 20 may perform authentication by comparing, or causing the image matching function 22 to compare, the image received from the user device 14-2 in step 3016 to either the image of the second user 16-2 stored in the user account 28 of the user 16-2 or the image of the intended message recipient. If there is a match, then the user 16-2 of the user device 14-2 is authenticated as the intended message recipient.

Once the user 16-2 is authenticated as the intended message recipient, the facemail delivery function 20 of the central server 12 sends the message to the user device 14-2 (step 3024). Once the message is received at the user device 14-2, the facemail client 30-2 presents the message to the user 16-2 at the user device 14-2 (step 3026). The message may be presented automatically or upon request by the user 16-2. The user profile, including the contact information, of the user 16-1 may or may not be available to the user 16-2 at this time. At this point, the facemail client 30-2 may receive user input from the user 16-2 defining whether the full profile of the user 16-2 or a partial profile of the user 16-2, if any, is to be sent to the user 16-1 (step 3028). In one embodiment, the partial user profile is a select subset of the user profile of the user 16-2 in the user account 28 of the user 16-2 and may be system-defined, defined by the user 16-2, or selected by the user 16-2 in response to receiving the message. If the user 16-2 chooses to reveal his or her full or partial user profile to the user 16-1, the facemail client 30-2 sends the full or partial profile to the central server 12 for delivery to the user 16-1 at the user device 14-1 or instructs the central server 12 to provide the full or partial user profile of the user 16-2 to the user 16-1 at the user device 14-1 (step 3030).

At this point, in one embodiment, the preferences of the user 16-1 in the user profile of the user 16-1 may include one or more response delay criteria, and the facemail delivery function 20 delays delivery of the full or partial profile of the user 16-2 to the user 16-1 in accordance with the one or more response delay criteria (step 3032). The one or more response delay criteria define an amount of time to delay delivery of the full or partial profile of the user 16-2 to the user 16-1 once the user 16-2 has approved sharing of his or her full or partial profile with the user 16-1. For example, the one or more response delay criteria may include a criterion that the full or partial profile of the user 16-2 is not to be returned to the user 16-1 until the physical distance between the users 16-1 and 16-2 is greater than a minimum distance defined by the user 16-1. As another example, the one or more response delay criteria may include a criterion that the full or partial profile of the user 16-2 is not to be returned to the user 16-1 until at least a minimum amount of time defined by the user 16-1 has expired since the users 16-1 and 16-2 where physically proximate to one another.

Lastly, the full or partial user profile of the user 16-2 is then sent to the user device 14-1 of the user 16-1, and presented to the user 16-1 (step 3034). While not shown, at this point, the user 16-1 may choose to reveal his or her full or partial user profile to the user 16-2 if this information was not previously provided to the user 16-2 in the message or in association with the message.

Note that the user 16-2 may choose to respond to the message in addition to or as an alternative to revealing his or her full or partial profile to the user 16-1. If the message delivered in step 3024 includes the contact information of the user 16-1 or if the contact information is provided in association with the message delivered in step 3024, any message sent from the user 16-2 to the user 16-1 in response to the message delivered in step 3024 may be provided directly from the user device 14-2 to the user device 14-1 of the user 16-1 using the appropriate communication system. For example, if the contact information provided for the user 16-1 is the email address of the user 16-1, the response message may be provided by the appropriate email system. However, if the contact information of the user 16-1 is not included in the message or is not provided in association with the message, any message sent from the user 16-2 to the user 16-1 in response to the message delivered in step 3024 may first be provided to the central server 12. The central server 12 may then deliver the response message to the user device 14-1 of the user 16-1.

It should also be noted that while the message discussed above with respect to FIG. 16 is a message similar to that described above with respect to FIGS. 2 and 4, the message may alternatively include questions, answers, and reward data as described above with respect to FIGS. 5 through 14. In this case, after the message is received by the facemail client 30-2 of the user device 14-2 in step 3024 of FIG. 16, the process would alternatively proceed in the same manner described above with respect to steps 2032-2048 of FIG. 5.

FIG. 17 illustrates an exemplary GUI that may be used by the user device 14-2 to obtain confirmation from the user 16-2 in step 3014 of FIG. 16. As illustrated, the GUI includes a text portion 114 that notifies the user 16-2 of the message and asking for permission to share the image of the user 16-2 with the user 16-1 to authenticate that the user 16-2 is in fact the intended message recipient. The GUI also includes buttons 116 and 118 that enable the user 16-2 to choose to share his or her image with the user 16-1 or to reject the message from the user 16-1, respectively.

FIG. 18 illustrates the operation of the system 10 according to another embodiment of the present disclosure. This embodiment is similar to that of FIG. 5 but wherein a question and answer session is suspended and thereafter resumed. At the point that this process begins, the users 16-1 through 16-N, or the user devices 14-1 through 14-N, have registered with the central server 12 and have reported their current locations to the central server 12 in a manner similar to that described above with respect to steps 2000-2014 of FIG. 5.

First, the user device 14-1, and more specifically the image acquisition function 32-1, obtains an image of an intended message recipient (step 4000). As discussed above, in one embodiment, the image acquisition function 32-1 is or includes an image capture device, and the image of the intended message recipient is obtained by capturing an image of the intended message recipient via the image capture device. As discussed above, in an alternative embodiment, the image of the intended message recipient may be obtained from an alternative source such as, for example, a photo sharing website or application, a website, an email attachment of an email from a friend, the corresponding user device of the intended message recipient, or the like.

Next, a message to the intended message recipient is generated (step 4002). More specifically, the user 16-1 may initiate the generation of the message to the intended message recipient and specify a payload for the message. The payload of the message is preferably a text message. However, the present disclosure is not limited thereto. In addition, the user 16-1 addresses the message using the image of the intended message recipient. As discussed above, in one embodiment, cropping or similar processing may be utilized to provide the image of the intended message recipient as a portrait of the intended message recipient.

In addition, in this embodiment, the user 16-1 defines a number of questions to ask the intended message recipient as well as a reward to be revealed to the intended message recipient upon answering the questions. More specifically, the user 16-1 may create the questions, select the questions from a predefined group of questions created by the user 16-1, select the questions from a group of system-defined questions, or the like. In one embodiment, each question includes the question body or text, a point value assigned to the question by the user 16-1, and possible answers to the question if the question is a multiple choice question. As discussed above, the point values assigned to the questions may be used to control revealing of the reward. The reward may be, for example, a picture of the user 16-1 sending the message, a full or partial profile of the user 16-1 sending the message, contact information for the user 16-1 sending the message, or the like.

The user device 14-1, and more specifically the facemail client 30-1, then sends the message including the image of the intended message recipient, the questions, and the reward information to the central server 12 (step 4004). Note that preferably, other than the image of the intended message recipient, no other contact information (e.g., email address, username, telephone number, etc.) of the intended message recipient is known by the user 16-1. The message is addressed to the intended message recipient using only or essentially the image of the intended message recipient. The message is not addressed using text or numbers as in traditional messaging systems. Also note that the location and time at which the image of the intended message recipient was captured may also be provided as part of the message or, alternatively, in association with the image of the intended message recipient such as in ID3 tags of the corresponding image file. Similarly, a direction in which the digital capture device used to capture the image of the intended message recipient was pointing at the time of capture of the image of the intended message recipient may also be provided as part of the message or, alternatively, in association with the image of the intended message recipient such as in ID3 tags of the corresponding image file.

Upon receiving the message from the user device 14-1, the central server 12 performs an image matching process to identify the intended message recipient, as described above with respect to, for example, step 1022 of FIG. 2 (step 4006). In this example, the user 16-2 is identified as the intended message recipient. Optionally, once the user 16-2 is identified as the intended message recipient, the facemail delivery function 20 of the central server 12 may perform block/delay processing to determine whether to block or delay the message based on the preferences of the user 16-2, as described above with respect to, for example, step 2024 of FIG. 2 (step 4008).

Next, assuming that the message is not blocked and after any delay has expired, the facemail delivery function 20 sends the message to the user device 14-2 of the user 16-2 (step 4012). Note that the intended message recipient may be verified by one or more friends of the user 16-2 as discussed above with respect to steps 2026 and 2028 of FIG. 5. In addition or alternatively, the image of the user 16-2 may be obtained and used for authentication as described above with respect to steps 3010-3022 prior to sending the message to the user device 14-2 as described above with respect to FIG. 16.

Once the message is received at the user device 14-2, the facemail client 30-2 presents the message to the user 16-2 at the user device 14-2 and a question and answer session begins (step 4014). The message may be presented automatically or upon request by the user 16-2. Either before, during, or after the message is presented to the user 16-2, the facemail client 30-2 presents the questions provided by the user 16-1 to the user 16-2. Thereafter, the facemail client 30-2 receives user input from the user 16-2 defining answers to the questions as part of the question and answer session.

In this embodiment, at some point during the question and answer session, the question and answer session is suspended (step 4016). The question and answer session may be manually suspended by the user 16-2. Alternatively, the message including the questions may be sent to the user 16-2 when the users 16-1 and 16-2 are physically proximate to one another, and the question and answer session may be automatically suspended once the users 16-1 and 16-2 are no longer physically proximate to one another. The facemail delivery function 20 then monitors the locations of the users 16-1 and 16-2 (step 4018). Thereafter, when the users 16-1 and 16-2 are again physically proximate to one another, the facemail delivery function 20 instructs the facemail client 30-2 to resume the question and answer session (step 4020). In response, the facemail client 30-2 resumes the question and answer session (step 4022). The user 16-2 then continues answering questions and, in response, the reward data is revealed to the user 16-2.

In this example, once the question and answer session is complete, a summary of the answers given by the user 16-2 is returned to the central server 12 (step 4024). The central server 12 then forwards the summary of the answers to the user device 14-1 of the user 16-1 where the summary of the answers may, for example, be presented to the user 16-1 (step 4026).

In addition, the facemail client 30-2 may receive user input from the user 16-2 defining whether the full profile of the user 16-2 or a partial profile of the user 16-2, if any, is to be sent to the user 16-1 (step 4028). If the user 16-2 chooses to reveal his or her full or partial user profile to the user 16-1, the facemail client 30-2 sends the full or partial profile to the central server 12 for delivery to the user 16-1 at the user device 14-1 or instructs the central server 12 to provide the full or partial user profile of the user 16-2 to the user 16-1 at the user device 14-1 (step 4030). At this point, in one embodiment, the preferences of the user 16-1 in the user profile of the user 16-1 may include one or more response delay criteria, and the facemail delivery function 20 delays delivery of the full or partial profile of the user 16-2 to the user 16-1 in accordance with the one or more response delay criteria (step 4032). The full or partial user profile of the user 16-2 is then sent to the user device 14-1 of the user 16-1, and presented to the user 16-1 (step 4034). Note that, in an alternative embodiment, the user 16-2 may choose to reveal his or her full or partial profile to the user 16-1 as a reward in response to answering one or more questions. While not shown, at this point, the user 16-1 may choose to reveal his or her full or partial user profile to the user 16-2 if this information was not previously provided to the user 16-2 in the message, in association with the message, or as the reward.

Note that the user 16-2 may choose to respond to the message in addition to or as an alternative to revealing his or her full or partial profile to the user 16-1. If the message delivered in step 4012 includes the contact information of the user 16-1 or if the contact information is provided in association with the message delivered in step 4012, any message sent from the user 16-2 to the user 16-1 in response to the message delivered in step 4012 may be provided directly from the user device 14-2 to the user device 14-1 of the user 16-1 using the appropriate communication system. For example, if the contact information provided for the user 16-1 is the email address of the user 16-1, the response message may be provided by the appropriate email system. However, if the contact information of the user 16-1 is not included in the message or is not provided in association with the message, any message sent from the user 16-2 to the user 16-1 in response to the message delivered in step 4012 may first be provided to the central server 12. The central server 12 may then deliver the response message to the user device 14-1 of the user 16-1.

FIG. 19 illustrates the system 10 according to another embodiment of the present disclosure. The system 10 of FIG. 19 is substantially the same as that discussed above. However, in this embodiment, the central server 12 also includes a question selection function 120, a question database 122, and an answer recommendation function 124. The question selection function 120 may be implemented in software, hardware, or a combination thereof. As discussed below, the question selection function 120 generally operates to select one or more questions 126 from the question database 122 to ask an intended message recipient based on common interests of the sender of the message and the intended message recipient. The question database 122 generally stores a collection of questions 126 to be used by all of the users 16-1 through 16-N. Alternatively, each of the users 16-1 through 16-N may create or select a collection of questions 126 that are stored within or in association with the user accounts 28 of the users 16-1 through 16-N. In this alternative embodiment, when, for example, the user 16-1 creates a message to send to an intended message recipient, questions to ask the intended message recipient are selected from the questions 126 stored in or associated with the user account 28 of the user 16-1 based on common interests of the user 16-1 and the intended message recipient.

The answer recommendation function 124 may also be implemented in software, hardware, or a combination thereof. As discussed below, the answer recommendation function 124 operates to suggest answers to questions sent to intended message recipients based on previous answers given by the intended message recipients to the same or similar questions, information stored in the user accounts 28 of the intended message recipients such as the user profiles of the intended message recipients, or usage information or statistics such as play histories of the intended message recipients, recent purchases made by the intended message recipients, web browsing history, or the like. Note that the answer recommendation function 124 may also be used in conjunction with the embodiment of the system 10 discussed above with respect to FIGS. 1 and 2.

FIG. 20 illustrates an exemplary embodiment of a question 126 stored in the question database 122 of FIG. 19. In general, the question 126 includes a question body 128, one or more keywords 130, a point value 132, and optionally a list of possible answers 134. The question body 128 includes the text forming the question. For example, the question body 128 may provide the text "Who is your favorite music artist or band?" The one or more keywords 130 define a topic of the question 126 or describe the subject matter of the question 126. The point value 132 is a point value assigned to the question 126. The point value 132 may be a system-defined point value. Alternatively, the point value 132 may be independently assigned for each user 16-1 through 16-N. The list of possible answers 134 provides a list of possible answers where, for example, the question 126 is a multiple choice question. Also note that, in an alternative embodiment, different point values may be assigned to each of the possible answers rather than assigning a single point value 132 to the question. This may be particularly beneficial where point values are assigned to the question 126 independently for each of the users 16-1 through 16-N.

FIGS. 21A and 21B illustrate the operation of the system 10 of FIG. 19 according to one embodiment of the present disclosure. First, the user devices 14-1 through 14-4, or alternatively the users 16-1 through 16-4, register with the central server 12 (steps 5000-5006). As discussed above, during registration, the user accounts 28 of the users 16-1 through 16-4 are created. Next, the user devices 14-1 through 14-4 provide their locations, or location information, to the central server 12 (steps 5008-5014). Again, the user devices 14-1 through 14-4 may send their locations to the central server 12 automatically. As an alternative, the central server 12 may poll the user devices 14-1 through 14-4 for their locations periodically or as otherwise desired. The locations of the user devices 14-1 through 14-4 are stored in the user accounts 28 of the corresponding users 16-1 through 16-4. The current locations of the user devices 14-1 through 14-N may be stored as the current locations of the users 16-1 through 16-4. In addition, historical records of the locations of the users 16-1 through 16-4 may be stored in the corresponding user accounts 28. At this point, in this example, the user device 14-1, and more specifically the image acquisition function 32-1, obtains an image of an intended message recipient (step 5016). As discussed above, in one embodiment, the image acquisition function 32-1 is or includes an image capture device that is used to capture the image of the intended message recipient. In an alternative embodiment, the image of the intended message recipient may be obtained from a secondary source such as, for example, a photo sharing website or application, a website, an email attachment of an email from a friend, a corresponding user device of the intended message recipient, or the like.

Next, a message to the intended message recipient is generated (step 5018). More specifically, the user 16-1 may initiate the generation of the message to the intended message recipient and specify a payload for the message. The payload of the message is preferably a text message. However, the present disclosure is not limited thereto. In addition, the user 16-1 addresses the message using the image of the intended message recipient. As discussed above, in one embodiment, cropping or similar processing may be utilized to provide the image of the intended message recipient as a portrait of the intended message recipient.

The user device 14-1, and more specifically the facemail client 30-1, then sends the message including the image of the intended message recipient to the central server 12 (step 5020). Note that preferably, other than the image of the intended message recipient, no other contact information (e.g., email address, username, telephone number, etc.) of the intended message recipient is known by the user 16-1. The message is addressed to the intended message recipient using only or essentially the image of the intended message recipient. Also note that the location and time at which the image of the intended message recipient was captured may also be provided as part of the message or, alternatively, in association with the image of the intended message recipient such as in ID3 tags of the corresponding image file. Similarly, a direction in which the digital capture device used to capture the image of the intended message recipient was pointing at the time of capture of the image of the intended message recipient may also be provided as part of the message or, alternatively, in association with the image of the intended message recipient such as in ID3 tags of the corresponding image file.

As discussed above, upon receiving the message from the user device 14-1, the central server 12 performs an image matching process to identify the intended message recipient (step 5022). In this example, the user 16-2 again is identified as the intended message recipient. Once the user 16-2 is identified as the intended message recipient, the facemail delivery function 20 of the central server 12 may interact with friends of the user 16-2 to verify that the user 16-2 is the intended message recipient (steps 5024 and 5026). In this example, the users 16-3 and 16-4 of the user devices 14-3 and 14-4, respectively, are identified in the friends list of the user 16-2. In addition or alternatively, the user 16-2 may be authenticated as the intended message recipient as discussed above with respect to FIG. 16.

Assuming that the user 16-2 is verified as the intended message recipient, the facemail delivery function 20 of the central server 12 then correlates interests of the users 16-1 and 16-2 to determine one or more keywords for selecting questions to ask the user 16-2 (step 5028). More specifically, in one embodiment, the user accounts 28 of the users 16-1 through 16-N also store keywords, or interest keywords, expressing interests of the users 16-1 through 16-N, respectively. As such, the question selection function 120 of the central server 12 correlates the interest keywords of the users 16-1 and 16-2 to identify common interest keywords. The question selection function 120 then selects one or more questions 126 of the question database 122 having keywords 130 (FIG. 20) matching the common interest keywords of the users 16-1 through 16-N (step 5030). Note that the number of questions 126 selected may be configurable by the user 16-1, system-defined, or the like.

As illustrated in FIG. 21B, in this embodiment, the central server 12 then sends the selected questions 126 to the user device 14-1 (step 5032). The user 16-1 may then be enabled to approve the questions 126 selected by the question selection function 120 of the central server 12, select one or more of the questions 126 selected by the question selection function 120 to ask the user 16-2, modify or edit the questions 126 selected by the question selection function 120, or the like. The user device 14-1 then sends a response to the central server 12

(step 5034). The response may approve the questions 126 selected by the question selection function 120 of the central server 12, identify a sub-set of the questions 126 selected by the question selection function 120 to ask the user 16-2, include any modifications or edits to the questions 126 selected by the question selection function 120, or the like. In addition, if the central server 12 does not already have the reward information for the message to be sent to the user 16-2, then the reward information may be provided at this time. Again, in one embodiment, the reward information includes one or more reward states, reward data, and an algorithm, as discussed above. The reward data and/or algorithm may be selected by the user 16-1 or may be system-defined.

In addition, the answer recommendation function 124 may suggest answers to one or more of the questions 126 to be included in the message sent to the user 16-2 (step 5036). In one embodiment, answers to previous questions answered by the user 16-2 are stored in the user account 28 of the user 16-2. Thus, if any of the questions 126 included in the message have previously been answered by the user 16-2, the answer recommendation function 124 may provide the previous answers given the user 16-2 as suggested answers to the corresponding questions 126. In addition or alternatively, if any of the questions 126 can be answered using information stored in the user account 28 of the user 16-2 and specifically stored in the user profile of the user 16-2, then the answer recommendation function 124 may obtain suggested answers for those questions from the user account 28 of the user 16-2. For example, if one of the questions 126 asks "What school do you attend?", then the answer recommendation function 124 may obtain this information from the user profile of the user 16-2 and suggest an answer accordingly. Still further, the user account 28 of the user 16-2 may include usage or historical information such as, for example, a play history identifying songs or other media items played by the user 16-2, a purchase history identifying recent purchases made by the user 16-2, a web browsing history of the user 16-2, a listing of events such as concerts attended by the user 16-2, a listing of movies recently seen by the user 16-2, or the like. Thus, as an example, if a question 126 asks "Who is your favorite music artist or band?", then the answer recommendation function 124 analyzes a play history of the user 16-2 and/or a historical record of music purchases made by the user 16-2 to suggest an answer to the question 126. A list of exemplary questions 126 and the manner in which the answer recommendation function 124 may suggest answers to those questions is provided in FIG. 22. The list also includes the point value 132 and the one or more keywords 130 for each question 126. Note, however, in this example, the questions 126 do not include possible answers 134.

Returning to FIG. 21B, at this point, the selected questions 126, or a modified set thereof, the reward information, and the suggested answers are appended to or inserted into the message to be provided to the intended message recipient, which in this example is the user 16-2. Optionally, once the user 16-2 is identified as the intended message recipient, the facemail delivery function 20 of the central server 12 may perform block/delay processing to determine whether to block or delay the message based on the preferences of the user 16-2 (step 5038). Note that the block/delay processing may alternatively be performed prior to step 5036. Next, assuming that the message is not blocked and after any delay has expired, the facemail delivery function 20 of the central server 12 then sends the message including the questions, reward information, and suggested answers to the user device 14-2 of the user 16-2 (step 5040). Once the message is received at the user device 14-2, the facemail client 30-2 presents the message to the user 16-2 at the user device 14-2 (step 5042). The message may be presented automatically or upon request by the user 16-2. Either before, during, or after the message is presented to the user 16-2, the facemail client 30-2 presents the questions to the user 16-2. Thereafter, the facemail client 30-2 receives user input from the user 16-2 defining answers to the questions (step 5044). As the answers are received, the facemail client 30-2 reveals the reward data from the reward information, as discussed above (step 5046). In this example, a summary of the answers given by the user 16-2 is returned to the central server 12 (step 5048). The central server 12 then forwards the summary of the answers to the user device 14-1 of the user 16-1 (step 5050).

While not illustrated, in addition to the user input from the user 16-2 answering the questions, the facemail client 30-2 may receive user input from the user 16-2 defining whether the full profile of the user 16-2 or a partial profile of the user 16-2, if any, is to be sent to the user 16-1, as discussed above. If the user 16-2 chooses to reveal his or her full or partial user profile to the user 16-1, the facemail client 30-2 sends the full or partial profile to the central server 12 for delivery to the user 16-1 at the user device 14-1 or instructs the central server 12 to provide the full or partial user profile of the user 16-2 to the user 16-1 at the user device 14-1. The full or partial user profile of the user 16-2 is then sent to the user device 14-1 of the user 16-1, and presented to the user 16-1. Note that, in an alternative embodiment, the user 16-2 may choose to reveal his or her full or partial profile to the user 16-1 as a reward in response to answering one or more questions. While not shown, at this point, the user 16-1 may choose to reveal his or her full or partial user profile to the user 16-2 if this information was not previously provided to the user 16-2 in the message, in association with the message, or as the reward.

Note that the user 16-2 may choose to respond to the message in addition to or as an alternative to revealing his or her full or partial profile to the user 16-1. If the message delivered in step 5040 includes the contact information of the user 16-1 or if the contact information is provided in association with the message delivered in step 5040, any message sent from the user 16-2 to the user 16-1 in response to the message delivered in step 5040 may be provided directly from the user device 14-2 to the user device 14-1 of the user 16-1 using the appropriate communication system. For example, if the contact information provided for the user 16-1 is the email address of the user 16-1, the response message may be provided by the appropriate email system. However, if the contact information of the user 16-1 is not included in the message or is not provided in association with the message, any message sent from the user 16-2 to the user 16-1 in response to the message delivered in step 5040 may first be provided to the central server 12. The central server 12 may then deliver the response message to the user device 14-1 of the user 16-1.

FIG. 23 is a block diagram of the central server 12 according to one embodiment of the present disclosure. In general, the central server 12 includes a control system 136 having associated memory 138. As will be appreciated by one of ordinary skill in the art upon reading this disclosure, the control system 136 is a processor, an Application Specific Integrated Circuit (ASIC), Field Programmable Gate Array (FPGA), or similar hardware providing processing capabilities. In this embodiment, the facemail delivery function 20, the image matching function 22, and the location tracking function 24 (FIGS. 1 and 19) are implemented in software and stored in the memory 138 for execution by the control system 136. In addition, if included, the question selection function 120 and the answer recommendation function 124 (FIG. 19)

may also be implemented in software and stored in the memory 138. However, the present disclosure is not limited thereto. The facemail delivery function 20, the image matching function 22, the location tracking function 24, the question selection function 120, and the answer recommendation function 124 may be implemented in software, hardware, or a combination thereof. The central server 12 may also include one or more digital storage devices 140 such as, for example, one or more hard disk drives. The one or more digital storage devices 140 may be used to store the user accounts database 26 (FIGS. 1 and 19) and the question database 122 (FIG. 19). The central server 12 also includes a communication interface 142 communicatively coupling the central server 12 to the network 18 (FIGS. 1 and 19). Lastly, the central server 12 may include a user interface 144, which may include components such as a display, one or more user input devices, or the like.

FIG. 24 is a block diagram of the user device 14-1 according to one embodiment of the present disclosure. This discussion is equally applicable to the other user devices 14-2 through 14-N. In general, the user device 14-1 includes a control system 146 having associated memory 148. As will be appreciated by one of ordinary skill in the art upon reading this disclosure, the control system 146 is a processor, ASIC, FPGA, or similar hardware providing processing capabilities. In this embodiment, the facemail client 30-1 (FIGS. 1 and 19) is implemented in software and stored in the memory 148 for execution by the control system 146. However, the present disclosure is not limited thereto. The facemail client 30-1 may be implemented in software, hardware, or a combination thereof. The user device 14-1 also includes the location determination function 34-1. The user device 14-1 may also include one or more digital storage devices 150 such as, for example, one or more hard disk drives. The user device 14-1 also includes a communication interface 152 communicatively coupling the user device 14-1 to the network 18 (FIGS. 1 and 19). The user device 14-1 also includes a user interface 154, which may include components such as a display, one or more user input devices, or the like. Lastly, the image acquisition function 32-1 (FIGS. 1 and 19) is, in this embodiment, implemented as or includes an image capture device 156. Alternatively, the image acquisition function 32-1 may be implemented in software and stored in the memory 148 for execution by the control system 146.

Those skilled in the art will recognize improvements and modifications to the preferred embodiments of the present disclosure. All such improvements and modifications are considered within the scope of the concepts disclosed herein and the claims that follow.

What is claimed is:

1. A computer-implemented method comprising:
    receiving, by a server, a message including an image of an intended message recipient from a first user device of a first user;
    after the server receives the message, performing an image matching process to match the image of the intended message recipient to an image of the second user, wherein an image of the second user matches the image of the intended message recipient such that the second user is identified as the intended message recipient;
    receiving, by the server, an image of a current user at the second user device wherein the second user device is assigned to the second user;
    authenticating that the current user at the second user device is the intended message recipient based on the image of the current user; and
    delivering the message to the second user device of the second user in response to authenticating that the current user at the second user device is the intended message recipient based on the image of the current user at the second user device and without communicating contact information of the second user to the first user device prior to delivering the message.

2. The method of claim 1 wherein the message is addressed to the intended message recipient using only the image of the intended message recipient.

3. The method of claim 1 wherein the message is not addressed to the intended message recipient using text or numbers.

4. The method of claim 1 further comprising verifying that the second user was near a location at which the image of the intended message recipient was captured at a time substantially equal to a time at which the image of the intended message recipient was captured.

5. The method of claim 1, wherein verifying that the second user was near the location at which the image of the intended message recipient was captured comprises verifying that the second user was:
    located near a location at which the image of the intended message recipient was captured at a time of capture of the image of the intended message recipient; and
    located in a direction from an image capture device that captured the image of the intended message recipient that corresponds to a direction in which the image capture device was pointing at the time of capture of the image of the intended message recipient.

6. The method of claim 1 wherein the message comprises a plurality of questions for a question and answer session at the second user device, and the method further comprises:
    suspending the question and answer session;
    sometime after suspending the question and answer session, detecting that the first and second users are physically proximate to one another; and
    automatically resuming the question and answer session in response to detecting that the first and second users are physically proximate to one another.

7. The method of claim 1 further comprising:
    determining whether to block delivery of the message to the second user device of the second user,
    wherein delivering the message to the second user device of the second user comprises:
        delivering the message to the second user device of the second user as a result of determining that delivery of the message is not to be blocked.

8. The method of claim 7 wherein determining whether to block delivery of the message to the second user device of the second user comprises determining that delivery of the message is to be blocked if a social network distance between the first and second users in a social network is greater than a defined maximum social network distance.

9. The method of claim 8 wherein determining whether to block delivery of the message to the second user device is in response to a request from the second user to block messages from users that are not within the defined maximum social network distance from the second user in the social network.

10. The method of claim 1 further comprising:
    determining whether to delay delivery of the message to the second user device of the second user,
    wherein delivering the message comprises:
        immediately delivering the message to the second user device of the second user when delivery of the message is not to be delayed; and
        delaying delivery of the message to the second user device of the second user when delivery of the message is to be delayed.

11. The method of claim 10 wherein determining whether to delay delivery of the message to the second user device of the second user comprises determining that delivery of the message is to be delayed if a physical distance between the first and second users is less than a defined minimum distance.

12. The method of claim 10 wherein determining whether to delay delivery of the message to the second user device of the second user comprises determining that delivery of the message is to be delayed until a defined amount of time has elapsed since the first and second users were last physically proximate to one another.

13. The method of claim 1 further comprising:
receiving a response from the second user device;
determining whether to delay delivery of the response to the first user at the first user device; and
delaying delivery of the response to the first user at the first user device if delivery of the response is to be delayed.

14. The method of claim 13 wherein determining whether to delay delivery of the response to the first user at the first user device comprises determining that delivery of the response is to be delayed until a physical distance between the first and second users is greater than a defined minimum distance.

15. The method of claim 13 wherein determining whether to delay delivery of the response to the first user at the first user device comprises determining that delivery of the response is to be delayed until a defined amount of time has elapsed since the first and second users were last physically proximate to one another.

16. A central server comprising: a communication interface communicatively coupling the central server to a plurality of user devices of a plurality of users; and
a processor-based control system associated with the communication interface and configured to:
receive a message including an image of an intended message recipient from a first user device of the plurality of user devices of a first user of the plurality of users;
identify a second user from the plurality of users as the intended message recipient based on the image of the intended message recipient
receive an image of a current user at the second user device wherein the second user device is assigned to the second user;
authenticate that the current user at the second user device is the intended message recipient based on the image of the current user: and
deliver the message to the second user device of the plurality of user devices of the second user in response to authenticating that the current user at the second user device is the intended message recipient based on the image of the current user at the second user device and without communicating contact information of the second user to the first user device prior to delivering the message.

17. A non-transitory computer readable medium that stores computer executable instructions for instructing at least one microprocessor to:
receive, by a server, a message including an image of an intended message recipient from a first user device of a first user;
after the server receives the message, perform an image matching process to match the image of the intended message recipient to an image of the second user, wherein an image of the second user matches the image of the intended message recipient such that the second user is identified as the intended message recipient;
receive, by the server, an image of a current user at the second user device wherein the second user device is assigned to the second user;
authenticate that the current user at the second user device is the intended message recipient based on the image of the current user; and
deliver the message to the second user device of the second user in response to authenticating that the current user at the second user device is the intended message recipient based on the image of the current user at the second user device and without communicating contact information of the second user to the first user device prior to delivering the message.

* * * * *